United States Patent
Doehla et al.

(10) Patent No.: US 8,462,946 B2
(45) Date of Patent: Jun. 11, 2013

(54) APPARATUS AND METHOD FOR STORING AND READING A FILE HAVING A MEDIA DATA CONTAINER AND METADATA CONTAINER

(75) Inventors: Stefan Doehla, Erlangen (DE); Stefan Kraegeloh, Erlangen (DE); Nikolaus Faerber, Erlangen (DE); Harald Fuchs, Roettenbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 532 days.

(21) Appl. No.: 12/666,327

(22) PCT Filed: Jul. 1, 2008

(86) PCT No.: PCT/EP2008/005374
§ 371 (c)(1),
(2), (4) Date: Feb. 12, 2010

(87) PCT Pub. No.: WO2009/003684
PCT Pub. Date: Jan. 8, 2009

(65) Prior Publication Data
US 2010/0189256 A1   Jul. 29, 2010

Related U.S. Application Data

(60) Provisional application No. 60/947,539, filed on Jul. 2, 2007.

(51) Int. Cl.
*H04L 29/06* (2006.01)
(52) U.S. Cl.
USPC ............................................ 380/217; 380/212
(58) Field of Classification Search
USPC .................... 380/217, 239, 212, 206
See application file for complete search history.

(56) References Cited

U.S. PATENT DOCUMENTS

| 5,765,164 A | 6/1998 | Prasad et al. |
| 6,169,843 B1 | 1/2001 | Lenihan et al. |

(Continued)

FOREIGN PATENT DOCUMENTS

| EP | 1 804 405 A1 | 7/2007 |
| JP | 2000-078197 A | 3/2000 |

(Continued)

OTHER PUBLICATIONS

Internet Streaming Media Aliance Implementation Specificaiton ISMA Encryption and Authenticaiton Version 1.1, Sep. 15, 2006.*

(Continued)

*Primary Examiner* — Ali Abyaneh
(74) *Attorney, Agent, or Firm* — Keating & Bennett, LLP

(57) ABSTRACT

An apparatus for recording a file having a related media data container and a metadata container, the apparatus a receiver for receiving first data packets having packetized first media data samples based on a first clock, and for receiving second data packets having second media data samples based on a second clock different from the first clock, wherein the second media data samples are associated to the first media data samples, and for receiving first control packets including information for indicating a relationship of the first clock to a reference clock and for receiving second control packets including information for indicating a relationship of the second clock to the reference clock, and a recorder for storing the received first and second data packets and at least a portion of the received first and second control packets in the media data container, and for storing associated metadata in the metadata container, the associated metadata having timing information of the received first and second data packets and the received first and second control packets and location information indicating a location of the stored first and second data packets and the stored first and second control packets in the media data container.

23 Claims, 12 Drawing Sheets

U.S. PATENT DOCUMENTS

| | | | |
|---|---|---|---|
| 6,311,221 B1 | 10/2001 | Raz et al. | |
| 6,377,966 B1 | 4/2002 | Cooper et al. | |
| 6,912,010 B2 | 6/2005 | Baker et al. | |
| 7,162,479 B2 | 1/2007 | Bentley | |
| 7,313,236 B2 * | 12/2007 | Amini et al. | 380/42 |
| 7,843,974 B2 * | 11/2010 | Hannuksela | 370/509 |
| 7,876,896 B2 | 1/2011 | Alkove et al. | |
| 2003/0138100 A1 | 7/2003 | Ishizaka et al. | |
| 2004/0202320 A1 | 10/2004 | Amini et al. | |
| 2005/0069295 A1 | 3/2005 | Kim et al. | |
| 2005/0089035 A1 | 4/2005 | Klemets et al. | |
| 2005/0123136 A1 | 6/2005 | Shin et al. | |
| 2005/0147053 A1 | 7/2005 | Saito et al. | |
| 2006/0129909 A1 | 6/2006 | Butt et al. | |
| 2006/0227813 A1 | 10/2006 | Mavrogeanes | |
| 2006/0256851 A1 | 11/2006 | Wang et al. | |
| 2007/0002902 A1 | 1/2007 | Hannuksela | |
| 2009/0010430 A1 * | 1/2009 | Tada et al. | 380/217 |
| 2009/0169001 A1 * | 7/2009 | Tighe et al. | 380/217 |

FOREIGN PATENT DOCUMENTS

| | | |
|---|---|---|
| RU | 2006113934 C2 | 8/2008 |
| RU | 2004120267 C2 | 11/2009 |
| RU | 2 377 736 C2 | 12/2009 |
| TW | 200534720 A | 10/2005 |
| TW | 200634742 A | 10/2006 |
| WO | 01/55877 A | 8/2001 |
| WO | 2005/045704 A1 | 5/2005 |
| WO | WO 2005045704 A1 * | 5/2005 |
| WO | 2007/012062 A1 | 1/2007 |

OTHER PUBLICATIONS

International Organization for Standard, coding audio, picture multimedia and hypermedia informaiton, Jan. 24, 2003.*

Official Communication issued in corresponding Taiwanese Patent Application No. 097124992, mailed on Dec. 20, 2011.

Doehla et al., "Apparatus and Method for Processing and Reading a File Having a Media Data Container and a Metadata Container", U.S. Appl. No. 12/665,753, filed Dec. 21, 2009.

Official Communication issued in corresponding Japanese Patent Application No. 2010-513776, mailed on Jun. 19, 2012.

English Translation of Official Communication issued in corresponding Russian Patent Application No. 2009 147 728, mailed on Sep. 6, 2010.

English Translation of Official Communication issued in corresponding Russian Patent Application No. 2009 148 647, mailed on Sep. 8, 2010.

Official Communication issued in International Patent Application No. PCT/EP2008/005374, mailed on Nov. 6, 2008.

Singer et al., "Text of ISO/IEC FDIS 14496-14", International Organisation for Standardisation, Apr. 30, 2003, pp. i-10.

"Information technology—JPEG 2000 image coding system—Part 12: ISO base media file format", International Standard, ISO/IEC 15444-12, Oct. 10, 2005, pp. i-82, Switzerland.

"Internet Streaming Media Alliance Implementation Specification", ISMA Encryption and Authentication, Version 1.1, Sep. 15, 2006, pp. 1-64, San Francisco, CA.

"Internet Streaming Media Alliance Implementation Specification", Version 1.0 + Corrigenda, Jun. 3, 2004, pp. 1-58, San Francisco, CA.

Fuchs, "Editors input on Music Player 2nd Edition FCD", International Organization for Standardization, Jan. 2007, No. M1425, pp. 1-9, Marrakech, Morroco.

Thoma et al., "Application Scenarios and Derived Requirements for Video Player MAF", International Organisation for Standardisation, Jul. 20, 2005, No. M12353, 2 pages, Poznan, PI.

Singer et al., "Proposed Revised Common Text Multimedia File Format Specification", International Organisation for Standardisation, Jan. 24, 2003, pp. 1-54.

Schulzrinne et al., "RTP: A Transport Protocol for Real-Time Applications", Jul. 2003, pp. 1-104.

* cited by examiner

APPARATUS AND METHOD FOR STORING AND READING A FILE HAVING A MEDIA DATA CONTAINER AND METADATA CONTAINER

BACKGROUND OF THE INVENTION

The invention relates to storing and/or reading transport protocol data packets and side information associated thereto to and/or from a file having a media data container and a metadata container, as e.g. a file based on the ISO (International Organization for Standardization) base media file format.

Various electronic devices are enabled to receive and present media data streams. Such media data streams can e.g. be received from a digital video broadcasting network that broadcasts media streams in accordance with e.g. the DVB-H Standard (Digital Video Broadcasting—Handhelds) or the DVB-T Standard (Digital Video Broadcasting—Terrestrial).

DVB-T uses a self-contained MPEG-2 (MPEG=Moving Pictures Expert Group) transport stream containing elementary MPEG-2 video and audio streams according to the international standard ISO/IEC 13818 (IEC=International Electrotechnical Commission). The MPEG-2 transport stream is a multiplex used in many of today's broadcast systems. It is a stream multiplex of one or more media programs, typically audio and video but also other data. MPEG-2 transport streams share a common clock and use time-stamped media samples (Access Units, AUs) in all media streams. This enables synchronization of sender and receiver clocks and lip synchronization of audio and video streams.

For DVB-H, elementary audio and video streams are encapsulated in RTP (Real-Time Transport Protocol), UDP (User Datagram Protocol), IP (Internet Protocol), and MPE (Multi-Protocol Encapsulation) for IP data casting. RTP is used for effective real-time delivery of multi-media data over IP networks. Multiplexing is typically done by associating different network ports to each distinct media stream, e.g. one network port for video and another one for audio. Different media usually stem from different sources having different clocks or clock rates. E.g., audio samples have a sample rate depending on the clock rate of an audio sampling device, wherein a frame rate of video frames depends on a video frame grabbing device's clock rate. Such clocks can have inherent frequency errors greater than a few hundred parts-per-million resulting in accumulated errors of tens of seconds per day. The term "clock skew" is defined as this difference in a clock's actual oscillator frequency from its nominal frequency. If a sender's clock operates faster than a receiver's clock, this can lead to packet accumulation at the receiver. If the sender clock operates at slower than the receiver clock, it will result in underfill of receiver buffers. Thus, if the receiver clock rate differs from the sender clock rate, then the receiver buffer(s) will either gradually fill or empty. Further, clock skew may lead to a de-synchronization between related audio and video samples at the receiver.

RTCP (Real-Time Transport Control Protocol) allows clock recovery and synchronization for RTP streams. An RTCP channel is associated with each RTP stream and comprises control information from sender to receiver in form of sender reports (SR) and vice versa. Each RTCP SR includes two timestamps: A NTP (Network Time Protocol) timestamp of a sender's system clock (reference time) and a corresponding media timestamp of the associated RTP stream. These RTCP SRs are sent for both audio and video. From the values of the RTP and NTP times the RTP packets may be set on a time line and the media may be perfectly synchronized.

A streaming service is defined as a set of synchronized media streams delivered in a time-constraint or unconstraint manner for immediate consumption during reception. Each streaming session may comprise audio, video and/or real-time media data like timed text. A user receiving media data for a movie by means of a mobile television, for instance, can watch the movie and/or record it to a file. Commonly, for this purpose the received data packets of the received media stream are de-packetized in order to store raw media data to the file. That is, received RTP packets or MPEG-2 packets are first de-packetized to obtain their payload in form of media data samples. Then, after de-packetizing, obtained media data samples are replayed or stored to the file. The obtained media samples are commonly compressed by formats like the H.264/AVC (AVC=Advanced Video Coding) video format and/or the MPEG-4 HE-AACv2 (HE-AACv2=High-Efficiency Advanced Audio Coding version 2) audio format. When media data samples having such video and/or audio formats are to be stored, they may be stored in a so-called 3GP file format, also known as 3GPP (3rd Generation Partnership Project) file format, or in an MP4 (MPEG-4) file format. Both 3GP and MP4 are derived from the ISO base media file format, which is specified in the ISO/IEC international standard 14496-12:2005 "Information technology-coding of audio-visual objects—part 12: ISO base media file format". A file of this format comprises media data and metadata. For such a file to be operable, both of these data may be present. The media data is stored in a media data container (mdat) related to the file and the metadata is stored in a metadata container (moov) of the file. Conventionally, the media data container comprises actual media samples. I.e., it may comprise e.g. interleaved, time-ordered video and/or audio frames. Thereby, each media has its own metadata track (trak) in the metadata container moov that describes the media content properties. Additional containers (also called boxes) in the metadata container moov may comprise information about file properties, file content, etc.

Recently, so-called reception hint tracks for files based on the ISO base media file format have been defined by international standardization groups. Those reception hint tracks may be used to store multiplexed and/or packetized streams like e.g. a received MPEG-2 transport stream or RTP packets. Reception hint tracks may be used for a client side storage and playback of received data packets. Thereby, received MPEG-2 TS or RTP packets of one stream are directly stored in reception hint tracks as e.g. pre-computed samples or constructors.

There are two advantages of this approach, compared to de-multiplexing and/or de-packetizing data packets and then writing separate media tracks for every elementary media stream (audio and/or video). Firstly, it lowers necessitated complexity of a receiving device during storage, because no de-multiplexing or other processing of the received data packets is necessary. Only file storage of the received data packets in unmodified form is performed. Secondly, in some cases it is not possible at all to de-multiplex the received data packets to separate media tracks, especially if the media is encrypted at the transport/multiplex level or the packetization scheme is unknown. Thirdly, time-shifting, i.e. write to the file and immediately read from the same file with variable time offset, in a PVR (PVR=Personal Video Recorder) application is made easier because of the first two points.

Playback from reception hint tracks may be done by emulating the normal stream reception and reading the stored data packets from the reception hint track as they were received over IP. Reception hint tracks, like all hint tracks, have transport timing, contrary to media tracks that have media playback timing. Therefore, a reception timestamp of the receiving device is associated to each data packet stored in a reception hint track.

RTP hint tracks in server-side files store only RTP media data packets from one stream and do not contain corresponding side- or control information, like e.g. RTCP information or key messages. RTCP information is generated on the fly by a streaming server, because it describes the current state of the streaming situation, e.g. the timing.

Streaming receivers may recover the sender system clock from reception times and align the receiver's system clock to the sender's system clock to avoid buffer overflow respectively under-run for direct playback. Due to jitter in arrival time (network jitter) of RTP packets or RTCP sender report packets, whatever of these is used for clock recovery, instant clock recovery is not possible. Independent audio and video capture units with unsynchronized sampling clocks may lead to drifting RTP clocks although the media timestamps increase constantly with a fixed rate. RTCP SRs carry the NTP and RTP timestamps for each of the streams and can therefore be used to extract the drift of the involved devices. In many systems there is jitter involved in the creation of RTCP SRs, specifically in the relationship between NTP and RTP clocks. It is therefore common that streaming clients may not achieve perfect lip-synchronization instantly after startup, but need to take a certain number of RTCP SRs into account before lip-synchronization between video and audio streams is accurate. If the sender's system clock needs to be recovered and there is high network jitter, then a certain number of RTP packets or RTCP sender report packets, whatever of these is used for clock recovery, is needed, too. Network jitter and clock drift may be recalculated during a real-time stream reception using information of multiple RTCP SRs as described above, in addition to the RTP timestamps of the related data packets.

Currently, RTP reception hint tracks are specified to only store received data packets of a media stream and do not contain the corresponding RTCP SRs, respectively the timing information from the sender reports. The RTP timestamp of a received RTP packet alone is insufficient to synchronize media data received from different streams. This is because generally each media stream assigns random values to its initial timestamp and initial sequence number, and the timestamp's clock frequency is dependent on the format of the media data carried. The arrival or reception time of the RTP packets may be used to synchronize between streams. The problem with this approach is, however, that RTP does not guarantee packet delivery, nor does it prevent out of band delivery. As a result, synchronization based on the reception time alone cannot guarantee accuracy.

As described above, the most accurate method of synchronization between different RTP streams necessitates waiting for associated RTCP SRs, which contain information enabling conversion between an RTP timestamp and a common timestamp among streams in the NTP timestamp format. These RTCP sender reports are usually sent every five seconds for each stream for a certain bit-rate, wherein the time interval between two RTCP SRs depends on the bit-rate.

Hence, playback of RTP reception hint tracks with accurate timing and lip synchronization is only possible in the following two cases: Firstly, there is no clock drift between the different media clocks and RTCP sender report interstream synchronization data are available for each received RTP packet. This, however, corresponds to an ideal situation which is very unlikely to occur in real environments. Secondly, the receiving device has to take the timing information of the RTCP SRs into account during storage by adjusting the RTP timestamps of the received RTP packets before storing them.

The first case is only a theoretical case and does not happen in practice. The second case puts a high burden on the receiver, as e.g. buffering of the received streams for some seconds would be needed to be able to take several sender RTCP SRs into account for the timing adjustment. This would also affect the ability of instant reading from the same file for time-shifting applications. Furthermore, an original reception situation cannot be recreated after storage, i.e. long-term jitter may not be removed in a processing stage after the complete stream is received and recorded.

Current broadcast systems use key streams (either in-band or out-of-band) for transporting protected keys as side-information that are used for decrypting media data of the related data packets. Typically there is only a loose coupling between a key stream and an encrypted media data stream and not a timing relation.

In the DVB-H and OMA-BCAST (Open Mobile Alliance—Mobile Broadcast Services) a key stream is defined as a separate stream of key messages sent on a different UDP port than the associated media stream. Every key message is sent as a single UDP packet. OMA-BCAST calls these messages short-term key messages (STKM), DVB-H calls them key stream messages (KSM). Storing key messages does not harm security of a streaming system because every key message is bound to the subscription of a streamed service and can therefore only be accessed by authorized subscribers/devices. An actual cryptographic key inside the key message is protected with the service or program key.

Each key has an associated key indicator (key ID), which is also indicated at the associated encrypted media access unit. A decryptor checks for the existence of the key, associated with a key ID in the encrypted access unit.

Synchronization of encrypted media access units and associated key messages is handled by frequently sending the keys with overlapping validity periods. The key is sent prior to the encrypted video packet, marked with the corresponding key indicator. The key is then valid at least as long as the media data is using this particular key.

Storage of the keys as a media track during recording of the file is not practicable since no media timing is associated with the key messages in the stream. Media timing association between the keys and the corresponding encrypted access units can only be made after processing and analyzing the key IDs that take care of the coupling of both the key and the media streams. Only after this analysis it is clear which key is used for which access unit or video frame.

SUMMARY

According to an embodiment, an apparatus for recording a file having a related media data container and a metadata container may have: a receiver for receiving first streamed RTP packets having packetized first media data samples based on a first clock, and for receiving second streamed RTP packets having second media data samples based on a second clock different from the first clock, wherein the second media data samples are associated to the first media data samples, and for receiving first RTCP packets related to the first streamed RTP packets and having information for indicating a relationship of the first clock to a reference clock and for receiving second RTCP packets related to the second streamed RTP packets and having information for indicating a relationship of the second clock to the reference clock; and a recorder for storing the received first and second streamed RTP packets and at least RTCP sender reports of the received first and second RTCP packets in the media data container, and for storing associated metadata in the metadata container, the associated metadata having reception time and/or transport protocol timestamp information of the received first and second streamed RTP packets and the received first and second RTCP packets and location information indicating a location of the stored first and second RTP packets and the stored first and second RTCP packets in the media data container.

According to another embodiment, a method for recording a file having a related media data container and a metadata container may have the steps of: receiving first streamed RTP packets having packetized first media data samples based on a first clock, and for receiving second streamed RTP packets having second media data samples based on a second clock different from the first clock, wherein the second media data samples are associated to the first media data samples, and for receiving first RTCP packets having information for indicating a relationship of the first clock to a reference clock and for receiving second RTCP packets having information for indicating a relationship of the second clock to the reference clock; and storing the received first and second streamed RTP packets and at least RTCP sender reports of the received first and second RTCP packets in the media data container, and for storing associated metadata in the metadata container, the associated metadata having reception time and/or transport protocol timestamp information of the received first and second streamed RTP packets and the received first and second RTCP packets and location information indicating a location of the stored first and second RTP packets and the stored first and second RTCP packets in the media data container.

According to another embodiment, a computer-program may execute, when the computer-program is running on a computer or microcontroller, a method for recording a file having a related media data container and a metadata container, wherein the method may have the steps of: receiving first streamed RTP packets having packetized first media data samples based on a first clock, and for receiving second streamed RTP packets having second media data samples based on a second clock different from the first clock, wherein the second media data samples are associated to the first media data samples, and for receiving first RTCP packets having information for indicating a relationship of the first clock to a reference clock and for receiving second RTCP packets having information for indicating a relationship of the second clock to the reference clock; and storing the received first and second streamed RTP packets and at least RTCP sender reports of the received first and second RTCP packets in the media data container, and for storing associated metadata in the metadata container, the associated metadata having reception time and/or transport protocol timestamp information of the received first and second streamed RTP packets and the received first and second RTCP packets and location information indicating a location of the stored first and second RTP packets and the stored first and second RTCP packets in the media data container.

According to another embodiment, an apparatus for reading a file, the file having stored, in a media data container related to the file, first streamed RTP packets having packetized first media data samples based on a first clock and second streamed RTP packets having packetized second media data samples based on a second clock different from the first clock, and the file having stored at least a RTCP sender report of associated first RTCP packets having information for indicating a relationship of the first clock to a reference clock and having stored at least a RTCP sender report of associated second RTCP packets having information for indicating a relationship of the second clock to the reference clock, the file having stored associated metadata in a metadata container of the file, the associated metadata having reception time and/or transport protocol timestamp information of the received first and second streamed RTP packets and the received first and second RTCP packets and location information indicating a location of the stored first and second RTP packets and the stored first and second RTCP packets in the media data container, may have: a processor for determining an output schedule of the stored first and second RTP packets by accessing the metadata container and by interpreting the reception time and/or transport protocol timestamp information of the stored first and second RTP packets and the stored first and second RTCP packets in the media data container, wherein the processor is adapted to determine synchronization information based on the stored reception time and/or transport protocol timestamp information of the first and second RTP packets and reference timestamps included in the RTCP sender reports of the stored first and second RTCP packets, such that an output schedule of the first RTP packets is synchronized to an output schedule of the second RTP packets with respect to media timing of the first and second media data samples, wherein the media timing is based on reference time information; and an output controller for outputting the first and second RTP packets in accordance to the determined output schedule by accessing metadata container and by reading the RTP packets from the media data container.

According to another embodiment, a method for reading a file, the file having stored, in a media data container related to the file, first streamed RTP packets having packetized first media data samples based on a first clock and second streamed RTP packets having packetized second media data samples based on a second clock different from the first clock, and the file having stored at least a RTCP sender report of associated first RTCP packets having information for indicating a relationship of the first clock to a reference clock and having stored at least a RTCP sender report of associated second RTCP packets having information for indicating a relationship of the second clock to the reference clock, the file having stored associated metadata in a metadata container of the file, the associated metadata having reception time and/or transport protocol timestamp timing information of the received first and second streamed RTP packets and the received first and second RTCP packets and location information indicating a location of the stored first and second RTP packets and the stored first and second RTCP packets in the media data container, may have the steps of: determining an output schedule of the stored first and second RTP packets by accessing the metadata container and by interpreting the reception time and/or transport protocol timestamp information of the stored first and second RTP packets and the stored first and second RTCP packets in the media data container, wherein synchronization information is determined based on the stored reception time and/or transport protocol timestamp information of the first and second RTP packets and reference timestamps included in the RTCP sender reports of the stored first and second RTCP packets, such that an output schedule of the first RTP packets is synchronized to an output schedule of the second RTP packets with respect to media timing of the first and second media data samples, wherein the media timing is based on reference time information; and outputting the first and second RTP packets in accordance to the determined output schedule by accessing metadata container and by reading the RTP packets from the media data container.

According to another embodiment, a computer-program may execute, when the computer-program is running on a computer or microcontroller, a method for reading a file, the file having stored, in a media data container related to the file, first streamed RTP packets having packetized first media data samples based on a first clock and second streamed RTP packets having packetized second media data samples based on a second clock different from the first clock, and the file having stored at least a RTCP sender report of associated first RTCP packets having information for indicating a relationship of the first clock to a reference clock and having stored at least a RTCP sender report of associated second RTCP packets having information for indicating a relationship of the second clock to the reference clock, the file having stored associated metadata in a metadata container of the file, the associated metadata having reception time and/or transport protocol timestamp timing information of the received first and second streamed RTP packets and the received first and second RTCP packets and location information indicating a location of the stored first and second RTP packets and the stored first and second RTCP packets in the media data container, wherein the method may have the steps of: determining an output schedule of the stored first and second RTP packets by accessing the metadata container and by interpreting the reception time and/or transport protocol timestamp information of the stored first and second RTP packets and the stored first and second RTCP packets in the media data container, wherein synchronization information is determined based on the stored reception time and/or transport protocol timestamp information of the first and second RTP packets and reference timestamps included in the RTCP sender reports of the stored first and second RTCP packets, such that an output schedule of the first RTP packets is synchronized to an output schedule of the second RTP packets with respect to media timing of the first and second media data samples, wherein the media timing is based on reference time information; and outputting the first and second RTP packets in accordance to the determined output schedule by accessing metadata container and by reading the RTP packets from the media data container.

For the solution of above-mentioned object, embodiments of the present invention also provide computer-programs for carrying out the inventive methods.

The present invention is based on the finding, that the above-mentioned problems may be solved at the same time by not only storing received streamed media data packets, but also associated data during reception carrying side-information, especially all associated data that is delivered in parallel to the media streams, like e.g. RTCP messages including RTCP sender reports, or by recording associated received key messages comprising cryptographic keys associated to the media data comprised by the received streamed media data packets.

This received associated data or side-information is stored in a file comprising a media data container and a metadata container in form of a so-called associated reception hint track ("arht"). This track is bound to the corresponding reception hint track, which contains the related media packets, using e.g. the track reference mechanism of ISO/IEC 14496-12. Like the related reception hint track, the associated reception hint track also stores transport timing in form of e.g. timestamps of a system clock of the receiver. This may enable restoring the timing conditions of the original packet reception at a later stage during playback.

The reception hint tracks and the associated reception hint tracks comprise packet data portions in the media data container and metadata portions in the metadata container of the file.

According to embodiments of the present invention, messages like RTCP SRs and related transport timing information are saved during recording of an associated reception hint track. In parallel, received media RTP packets and related transport timing are stored directly to a reception hint track. During recording, no de-jitter process or lip-synchronization correction is performed.

For this purpose, an embodiment of the present invention provides an apparatus for recording a file having a related media data container and a metadata container. The apparatus comprises a receiver for receiving first data packets comprising packetized first media data samples based on a first clock, and for receiving second data packets comprising second media data samples based on a second clock different from the first clock, wherein the second media data samples are associated to the first media data samples. The receiver is further adapted to receive first control packets including information for indicating a relationship of the first clock to a reference clock and to receive second control packets including information for indicating a relationship of the second clock to the reference clock. The apparatus also comprises a recorder for storing the received first and second data packets and at least portions of the received first and second control packets in the media data container, and for storing associated metadata in the metadata container, the associated metadata comprising timing information of the received first and second data packets and the received first and second control packets and comprising location information indicating a location of the stored first and second data packets and the stored first and second control packets in the media data container.

According to an embodiment of the present invention, the recorder is adapted to store the first and second received data packets as samples in first chunks of the media data container, and to store at least portions of the received associated first and second control packets as samples in second chunks of the media data container.

According to an embodiment of the present invention the recorder is adapted to store the timing information and the location information of the first and second data packets in a first track of the metadata container, and to store the timing information and the location information of the first and second control packets in a second track of the metadata container of the file.

According to an embodiment of the present invention the file is based on the ISO base media file format. According to an embodiment of the present invention the file is a 3GP- or a MP4-file.

According to an embodiment of the present invention the first data packets are first streamed RTP packets comprising packetized first media samples (e.g. compressed video) and the first control packets are RTCP packets related to the first streamed RTP packets comprising first RTCP sender reports. The second data packets are second streamed RTP packets comprising packetized second media data samples (e.g. compressed audio related to the video) and the second control packets are RTCP packets related to the second streamed RTP packets comprising second RTCP sender reports.

Parallel storage of the first and second data packets and the associated control packet has the advantage that the recording process is still lightweight and may capture all information needed for playing back the media streams from the recorded file at a later stage. The associated reception hint tracks, i.e. the stored control packets in the media data container and the associated meta information in the metadata container, is used during playback of the reception hint tracks, i.e. the stored first and/or second data packets in the media data container and their associated meta information stored in the metadata container of the file.

For the purpose of playback of the recorded file, embodiments of the present invention provide an apparatus for reading the file, the file having stored, in a media data container related to the file, first data packets comprising packetized first media data samples based on a first clock and second data packets comprising packetized second media data samples based on a second clock different from the first clock. The file has also stored at least portions of associated first control packets including information for indicating a relationship of the first clock to a reference clock and at least portions of associated second control packets including information for indicating a relationship of the second clock to a reference clock. The file has stored associated metadata in a metadata container of the file, the associated metadata container comprising timing information of the received first and second data packets and the received first and second control packets and location information indicating a location of the stored first and second data packets and a location of the stored first and second control packets in the media data container. The apparatus for reading the file comprises a processor for determining an output schedule of the stored first and second data packets by accessing the metadata container and by interpreting the timing information of the stored first and second data packets and the stored first and second control packets in the media data container. The apparatus further comprises an output controller for outputting the first and second data packets in accordance to the determined output schedule by accessing the media data container and by reading the data packets from the media data container.

In accordance with embodiments of the present invention, the stored first and second data packets and the associated stored first and second control packets may be processed on-the-fly for lip-synchronization, clock-recovery and/or clock-drift adjustment. This kind of playback is equivalent to a simulated live reception of the recorded media streams.

The recorded reception hint tracks (first/second data packets) and the recorded associated reception hint tracks (first/second control packets) span an entire recording. During playback or replay, control data of the associated reception hint track, e.g. in form of RTCP SRs, may be pre-fetched, e.g. for accurate lip-synchronization by taking multiple future RTCP SRs into account, wherein the future RTCP SRs relate to time instants in the future of a current playback time instant.

An advantage of the present invention is that the concept of the associated reception hint tracks, i.e. the recording of control information during the reception of media streams, enables a lightweight recording process of all information relevant for synchronized playback of the streams from the file merely without additional complexity.

In case the recorded file is intended for long-term storage and will be eventually played back many times, it may be desirable to avoid analyzing the stored first/second data packets and the stored first/second control packets together with the associated metadata, respectively, during every playback and, instead, to have the media timing, i.e. the timing for replaying the first/second media data samples comprised by the first/second stored data packets, directly available without further processing.

Usually, this would imply to de-packetize the stored data packets from the reception hint track and to save it to media tracks in related media data containers with one elementary stream per track. This is not always possible or desirable, e.g. if transport encryption was applied to the stream packets or if storage capacity is limited.

In addition to accurate timing of the transport packets, it is desirable to have extended information available about the reception hint tracks (the stored first/second data packets plus meta information), particularly information on the media data samples inside the first/second data packets, e.g. frame-accurate SMPTE timestamps (SMPTE=Society of Motion Picture and Television Engineers) or subtitles for a video track.

For this purpose, embodiments of the present invention also provide an apparatus for processing the data packets related to a transmission protocol stored in the media data container related to the file and for processing stored associated meta information in a metadata container of the file, the associated meta information comprising transport timing information and location information indicating a location of the stored data packets in the media container. The apparatus comprises a processor for determining, based on the stored data packets and the stored associated meta information, decoding information for a payload of the stored data packets, wherein the decoding information indicates at which time instant to replay which payload of the stored data packets. The apparatus for processing may be a stand-alone device as well as a device being integrated into the above-mentioned apparatus for storing the file.

According to an embodiment the stored data packets may comprise MPEG-2 transport stream packets. According to another embodiment the stored data packets may comprise RTP packets comprising packetized media data.

According to embodiments of the present invention, the decoding information is determined on a media access unit basis. I.e., for each access unit, e.g. a media frame, a decoding information sample is stored in the media data container of the file, wherein the decoding information sample indicates from which portions of stored data packets to take which media data samples in order to obtain a media (e.g. video/audio) frame. Meta information relating to the decoding information samples is stored in a decoding information metadata track in the metadata container. The decoding information metadata track ("trak" box/atom of the ISO base media file format) thereby comprises timing and location information for the decoding information samples.

The stored decoding information samples and their associated decoding information metadata track, also referred to "virtual media track" in the following, builds on the idea of the associated reception hint tracks and offers the above-described advantages for playback. In a metadata portion of the virtual media tracks, media timing for related decoding information samples in the media data container is provided. The decoding information samples provide information from which stored data packets or transport units to obtain media data for a related media access unit, which makes de-packetization of the media packets unnecessary. The virtual media tracks may be built after final reception of the media streams using information from the reception hint tracks and, if needed, the associated reception hint tracks. This is done in a "reversed hinting process" and the resulting file enables a playback device to search in the file and to perform random access to the media based on media timing.

Virtual media tracks may be seen as incomplete media tracks. Therefore, both the recovered timing from RTP and RTCP reception hint tracks and all indexes (typically by using "sample tables") of media tracks can be applied. Additionally, timed metadata tracks may reference virtual media tracks and extend them.

Virtual media tracks may be built of decoding information samples (virtual media samples) that may contain constructors for a reconstruction of access units from reception hint track transport units. Further, the decoding information samples may contain links to one or more significant transmission units, relevant for the reconstruction of an access unit (incomplete constructor). Also, the decoding information samples or virtual media samples of a virtual media track may be empty, e.g. in the case of a packet loss during the reception process. Alternatively, decoding information samples of a virtual track, also referred to as virtual media samples in the following, may contain completely unpacked media samples like in a classic media track.

Information from indexes in sample tables of the virtual media track (and any associated information from e.g. timed metadata tracks) can be logically applied to the reference reception hint track by following a link to the corresponding transmission unit of the reception hint track.

Virtual media tracks may contain approximate and incomplete descriptions of the virtual media samples if the descriptions cannot be exactly recovered from the stream. This applies especially when data packets are encrypted or the de-packetization scheme is not completely known.

For replaying virtual media tracks, embodiments of the present invention provide an apparatus for reading a file, the file having stored, in a media data container related to the file, data packets comprising a payload, and having stored, in the media data container, decoding information for the payload of the stored data packets, wherein the decoding information indicates at which time instant to replay which payload of the stored data packets, the file having stored associated metadata in a media data container, the associated metadata indicating a decoding time and a location of the decoding information in the media data container. The apparatus comprises a processor for determining an output schedule of the payload of the stored data packets by accessing the associated metadata in the media data container and by accessing, based on the metadata, the decoding information in the media data container, and by accessing, based on the decoding information, the payload of the stored data packets. An output controller serves for outputting the payload in accordance with the determined output schedule.

Compared to an on-the-fly conversion of the received data packets to media tracks during recording, the virtual media tracks provide media timing and metadata without the necessity to de-packetize the media data (stored data packets) and thus may save storage space. They enable a playback device to search in the file based on media timing. Virtual media tracks combine the advantages of media tracks and reception hint tracks without doubling a file size, which would be the case if classic media tracks would be added to the file. With the concept of virtual media tracks all information of the original reception process is kept, e.g. information about lost packets that helps error concealment and information about reception timing that helps lip-synchronization. At the same time all possibilities of conventional media tracks for media access are offered by the inventive virtual media tracks. Even more flexibility is offered compared to conventional media tracks. It may be decided on a sample-by-sample basis if stored transport units (data packets) are completely unpacked to access units (media frames) or if only constructors or links for the reconstruction of the access units are stored, e.g. to save storage space. Further, all possibilities may be mixed in one virtual media track, i.e. decoding information samples or virtual media samples comprising complete access units, constructors, links or being empty.

Multiple virtual media tracks may reference transmission units or data packets from the same reception hint track enabling different indexes of the same recorded data packet stream. E.g., two virtual media tracks with random access, one related to audio, another related to video, point indexes for audio and video of the same MPEG-2 transport stream reception hint track.

To enable a playback or replay of encrypted media data samples in received and stored data packets, associated key stream messages may be also stored—aside the data packets—in the media data container of the file. The key stream messages are stored in samples of a key stream reception hint track, according to embodiments of the present invention. Reception time (transport time) may be used as a timestamp of the key stream samples to align the key messages to the encrypted media packets in the corresponding reception hint track. A track reference is used to associate the key stream reception hint track to the media reception hint track.

For the purpose of recording the file, embodiments of the present invention provide an apparatus for recording the file having a related media data container and a metadata container. The apparatus comprises a receiver for receiving data packets each comprising a payload, and for receiving key stream packets comprising a plurality of cryptographic keys, wherein each cryptographic key is associated to a payload of the data packets. The apparatus comprises a recorder for storing the received data packets and the received key stream packets in the media data container, and for storing associated metadata in the metadata container, the associated metadata comprising transport timing information of the received data packets and the received key stream packets and location information indicating a location of the stored data packets and the stored key stream packets in the media data container. The apparatus for recording the data packets and the key stream packets may be a stand-alone device as well as a device being integrated into or combined with the above-mentioned apparatus for storing and/or processing.

According to embodiments of the present invention, the recorder is adapted to store the received data packets as samples in first chunks of the media data container and to store the received associated key stream packets as samples in second chunks of the media data container. According to embodiments of the present invention, the recorder is adapted to store the transport timing information and the location information of the data packets in a first track of the media data container and to store the transport timing information and the location information of the key stream packets in a second track of the metadata container.

According to an embodiment of the present invention the file is based on the ISO base media file format.

According to an embodiment of the present invention the data packets comprise MPEG-2 transport stream packets.

According to a further embodiment of the present invention the data packets comprise RTP packets comprising packetized media data samples.

To ease playback after reception of the data packet stream and the associated key stream, a one-time processing may be performed to convert the key stream reception hint track into a virtual metadata track. The key messages from the key stream reception hint track with transport timing may be transformed to key samples in a virtual metadata track with media timing, similar to the above-described virtual media tracks. If needed, key samples are virtually doubled, so that every media sample in the media track has an associated key sample in the key track.

It is therefore possible to create an accurate timing relationship between the media access units and the key messages, especially if encrypted access units can be reconstructed from the transmission units (in case of content encryption).

For replaying embodiments provide an apparatus for reading a file, the file having stored data packets comprising packetized media data samples and the file having stored associated key stream packets in a media data container related to the file. The file has stored associated metadata in a metadata container, the associated metadata comprising transport timing information of the received data packets and the received key stream packets and location information indicating a location of the stored data packets and the stored key stream packets in the media data container. Further, the apparatus comprises a processor for assigning, based on the data packets, based on the associated meta information and based on the stored key stream packets and the associated key stream meta information, decryption information to a payload of the stored data packets, wherein the decryption information indicates which cryptographic key to use at which time to replay the payload of the stored data packets. An output is provided for outputting decrypted data packets based on the assigned decryption information.

Embodiments of the present invention fully preserve reception timing of key messages and the timing relationship to the received data packets. Embodiments of the present invention enable the conversion of the recorded files to files optimized for playback, when the files contains a metadata track with key messages for every corresponding media sample in the media tracks comprising the stored data packets. Thus, it is not necessary to parse the recorded key track for the correct key during playback.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
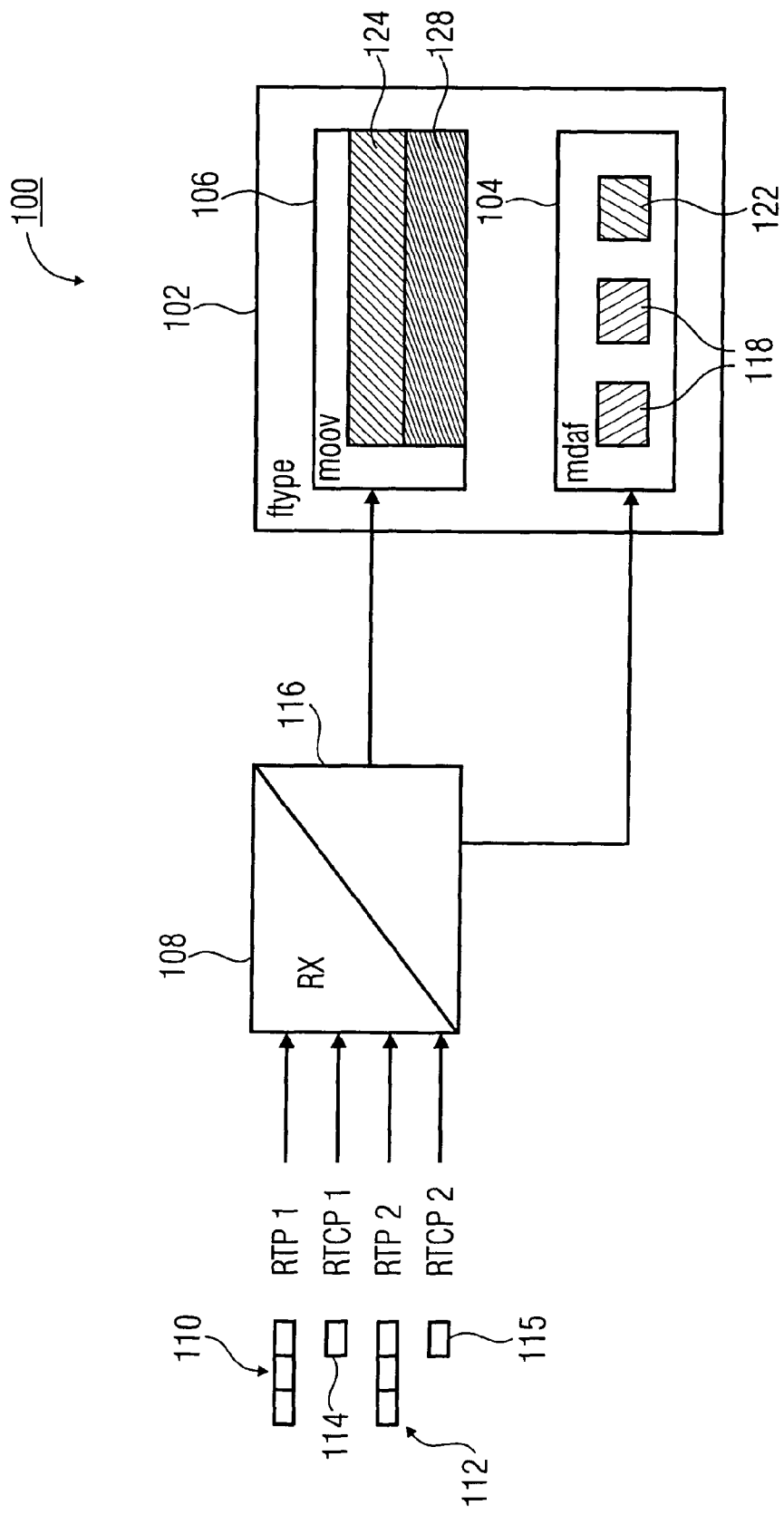
FIG. 1 is a schematic block diagram of an apparatus for recording a file according to an embodiment of the present invention.

FIG. 1 shows a schematic flow chart of an apparatus 100 for recording a file 102 having a related media data container 104 and metadata container 106.

The apparatus 100 comprises a receiver 108 for receiving first data packets 110 comprising packetized first media data samples based on a first clock, and for receiving second data packets 112 comprising second media data samples based on a second clock different from the first clock, wherein the second media data samples are associated with the first media data samples. Further, the receiver 108 serves for receiving first control packets 114, including information for indicating a relationship of the first clock to a reference clock, and for receiving second control packets 115, including information for indicating a relationship of the second clock to the reference clock. Further, the apparatus 100 comprises a recorder 116 for storing the received first and second data packets 110, 112 and at least a portion of the received first and second control packets 114, 115 in the media data container 104, and for storing associated metadata in the metadata container 106. The associated metadata comprises timing information of the received first and second data packets 110, 112 and the received first and second control packets 114, 115. Further, the associated metadata comprises location information indicating a location of the stored first and second data packets 110, 112 and the stored first and second control packets 114, 115 in the media data container 104.

According to embodiments of the present invention the first data packets 110 may be first streamed RTP packets comprising packetized first media data samples (e.g. video) and the second data packets 112 may be second streamed RTP packets comprising packetized second media data samples (e.g. audio). Accordingly, the first control data packets 114 may be RTCP packets associated to the first streamed RTP packets 110, wherein the second control data packets 115 may be RTCP packets associated to the second streamed RTP packets 112.

The file 102 may be a file based on the ISO base media file format, according to embodiments of the present invention. E.g., the file format may be an MPEG-4-compatible file format, i.e. the file 102 may be a so-called MP4 file specified by ISO/IEC 14496-14. The MP4 file format is composed of metadata stored in the metadata container 106, the metadata describing information typically relating to media stored in the media data container 104. The media data container 104 may also reside outside the file 102. E.g., media data container 104 may be a separate storage location, which may be referenced by links in the file 102. Normally, media data stored in the media data container 104 is encoded video and/or audio data. The containers 104 and 106 are data structures called "boxes" (or "atoms") in the related specifications.

Typically, a box is composed of a size field, a type field and a data field. A size of the entire box, that is the number of bytes, including the size field, is contained in the size field. A box identifier, usually four letters, is stored in the type field of the box. Actual header data and media data are stored in the data field. The metadata container 106 that forms the MP4 file format described above using such a box structure is typically called a movie box "moon". Similarly, the media data container 104 is called a media data box, hereinafter "mdat".

The media data container mdat 104 is typically composed of a sequence of data units or samples that are grouped into so-called chunks. Chunks can be of different sizes, and the samples within a chunk can have different sizes.

Figure 2:
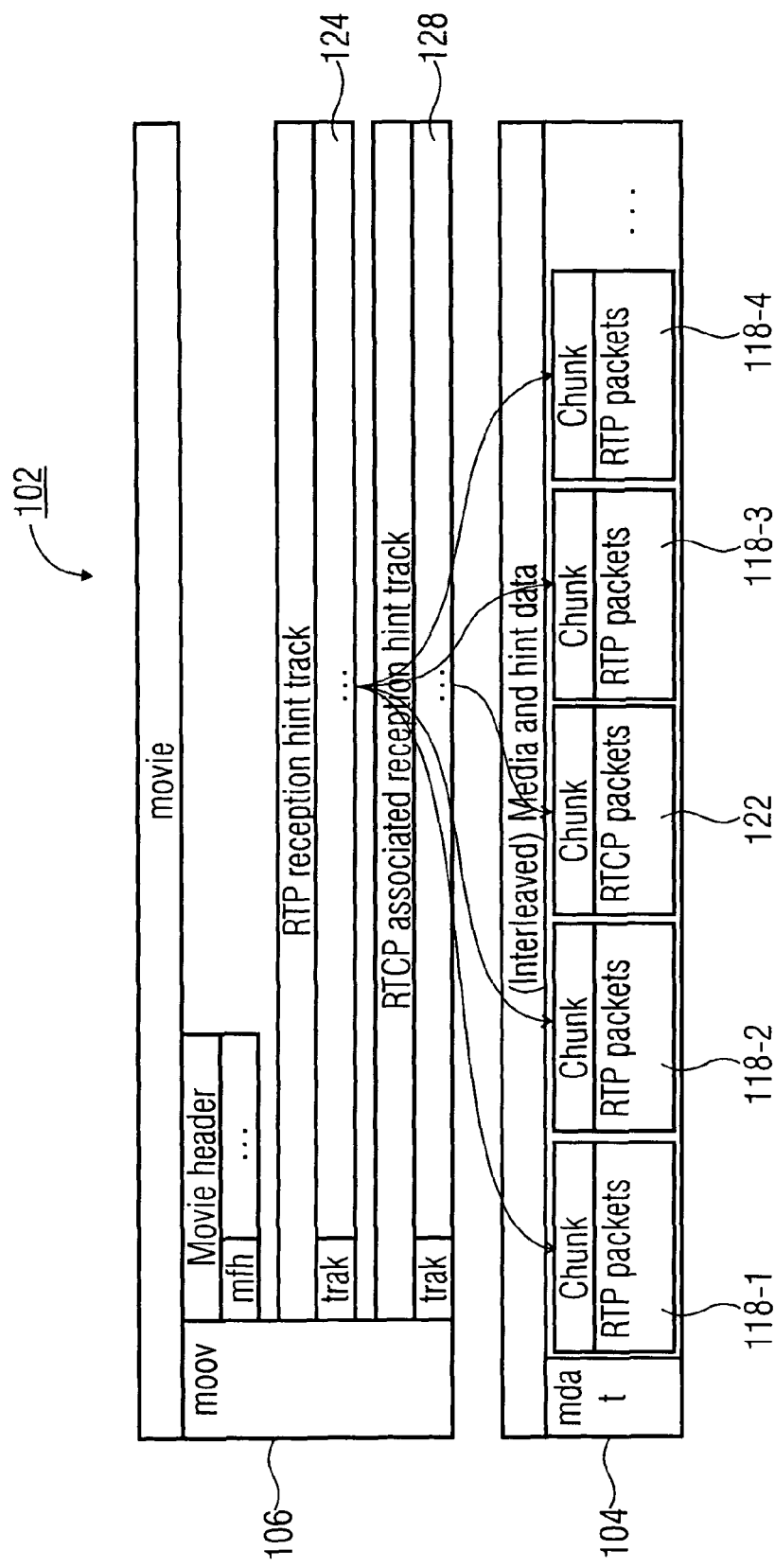
FIG. 2 shows a schematic file structure of a recorded file having a related media data container and a metadata container according to an embodiment of the present invention.

According to embodiments of the present invention the recorder 116 is adapted to store the first and second received data packets 110, 112 as samples in first chunks 118 of the media data container 104. The recorder 116 is further adapted to store at least portions of the received associated first and second control packets 114, 115 as samples in second chunks 122 of the media data container 104, as can be seen in FIG. 2.

The storing of the chunks 118, 122 may be done in an interleaved manner.

A sample of a chunk may thereby comprise one or more received data packets. That is, a sample of a first chunk 118 may comprise one or more received first and/or second RTP packets 110, 112, and a sample of a second chunk 122 may comprise one or more first and/or second RTCP SRs of the received first and/or second control packets 114, 115.

A plurality of first chunks 118 may be regarded as a media data portion of a (RTP-) reception hint track. Likewise, a plurality of second chunks 122 may be regarded as a media data portion of an associated (RTCP-) reception hint track for the reception hint track. I.e., in the case of FIG. 1 or FIG. 2, there is one RTP reception hint track for all received RTP packets 110, 112 and one associated RTCP reception hint track for all received RTCP packets 114, 115 or RTCP SRs. This means minimum recoding complexity.

A RTCP reception hint track does not need any generic packet payload configuration data, albeit it is only useful in combination with the SDP (Session Description Protocol) information of its related base RTP reception hint track.

A RTCP reception hint track sample payload consists of a raw RTCP packet. This raw RTCP packet may be included directly with its RTCP headers or be wrapped inside another structure to allow the storage of multiple RTCP packets in one sample.

The timing of an RTCP sample is dependent on the timing method of its associated RTP reception hint track. If the RTP reception hint track derives its decoding time from the RTP timestamps, the RTCP reception hint track will also derive its decoding time from the RTP timestamps in the RTCP packets. If the reception time is used for RTP reception hint tracks, reception timing will also be used for storing RTCP packets. In general, both RTP reception hint track and RTCP reception hint track are synchronized and use the same time base.

As shown in FIGS. 1 and 2, the recorder 116 may be adapted to store the timing information and the location information of the first and second received data packets 110, 112 in a first metadata track 124 of the media data container 106 and to store the timing information and the location information of the received first and second control packets 114, 115 associated to the first and second data packets 110, 112 in a second metadata track 128 of the media data container 106. A more detailed description of the storage process will be given with reference to FIG. 3.

The first metadata track 124 may be regarded as a metadata portion of the RTP reception hint track. Likewise, the second metadata track 124 may be regarded as a metadata portion of the associated RTCP hint track for the reception hint track.

In the example of FIG. 2, the individual media streams (e.g. video/audio) may be identified from the single RTP reception hint track and the single associated RTCP reception hint track at a later stage, e.g. by using SDP information on the respective media type stored in conjunction with the RTP packets.

FIG. 2 shows the structure of an ISO media file 102 with a RTP reception hint track and an associated RTCP reception hint track.

As described before, the file 102 comprises a metadata container 106 wherein the metadata container 106 comprises a RTP reception hint track 124 comprising timing information related to received RTP packets stored as samples in first chunks 118-1, 118-2, etc., in the media data container 104. That is, the RTP reception hint track 124 comprises information transport timing of the stored (first and second) RTP packets during reception.

This transport timing may be a timestamp of a reception clock of the receiver 108 and/or it may an RTP timestamp of the received RTP packets 110, 112. That is, for each RTP packet or sample the metadata portion 124 of the RTP reception hint track comprises an indication on when the respective RTP packet 110, 112 was received and, additionally, information on where the respective RTP packet was stored in the media data container 104.

The same holds for the metadata portion 128 of the associated RTCP reception hint track. It comprises transport timing information of the received RTCP packets that are stored in second chunks 122. The transport timing information may be e.g. a reception time of a related RTCP packet or an RTP timestamp of a RTP packet related to the RTCP packet. Furthermore, the metadata portion 128 of the associated RTCP reception hint track comprises location information indicating where a RTCP packet was stored in the media data container 104.

According to other embodiments, those SDP parameters may be directly analyzed during the recording process, such that the RTP sessions related to different media may be stored to separate RTP reception hint tracks and separate associated RTCP reception hint tracks immediately.

Hence, according to embodiments of the present invention the recorder 116 is adapted to store the first received data packets 110 as samples in first chunks of the media data container 104. The recorder 116 is further adapted to store the second received data packets 112 as samples in second chunks of the media data container 104. The recorder 116 is adapted to store at least portions of the received associated first control packets 114 as samples in third chunks of the media data container 104 and to store at least portions of the received associated second control packets 114 as samples in fourth chunks of the media data container 104.

The storing of the chunks may be done in an interleaved manner. That is, according to an embodiment of the present invention, first RTP packets related to a first media stream (e.g. video), the second RTP packets 112 related to a second media stream (e.g. audio) and associated first and second RTCP packets or at least first and second RTCP sender reports may be stored as samples of first, second, third and fourth chunks in interleaved manner.

A sample of a chunk may thereby comprise one or more received data packets. That is, a sample of a first chunk may comprise one or more received first data packets 110, a sample of a second chunk may comprise one or more received second data packets 112, a sample of a third chunk may comprise one or more first RTCP SRs of the received first control packets 114 and a sample of a fourth chunk may comprise one or more second RTCP SRs of the received second control packets 115.

A plurality of first chunks may be regarded as a media data portion of a first reception hint track related to the media of the first packets 110. A plurality of second chunks may be regarded as a media data portion of a second reception hint track related to the media of the second packets 112. A plurality of third chunks may be regarded as a media data portion of an associated hint track for the first reception hint track. Likewise, a plurality of fourth chunks may be regarded as a media data portion of an associated hint track for the second reception hint track. I.e., in case of RTP reception hint tracks and RTCP associated reception hint tracks, a reception hint track may be recorded for every identified RTP session and an associated reception hint track may be recorded for each of the recorded RTP reception hint tracks.

According to an embodiment of the present invention the recorder 116 is adapted to store the timing information and the location information of the first received data packets 110 in a first metadata track of the media data container 106 and to store the timing information and the location information of the second received data packets 112 in a second metadata track of the metadata container 106. The recorder 116 is adapted to store the timing information and the location information of the received first control packets 114 associated to the first data packets 110 in a third metadata track of the media data container 106 and to store the timing information and the location information of the received second control packets 115 associated to the second data packets 112 in a fourth metadata track of the media data container 106.

Figure 3:
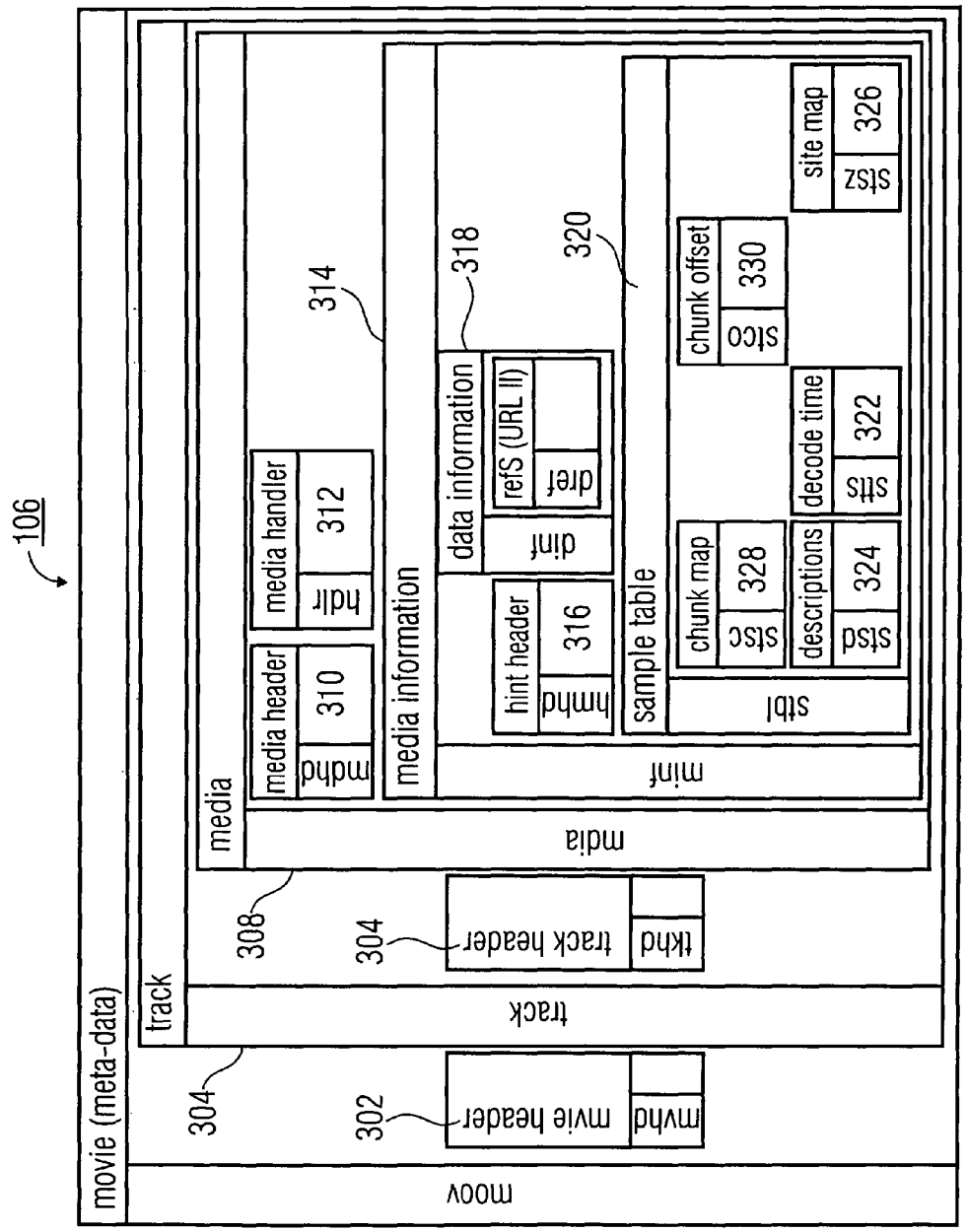
FIG. 3 shows a schematic structure of a file based on the ISO base media file format.

Now turning to FIG. 3, a more detailed description of the metadata container 106 of a file based on the ISO media base format shall be given.

The media data container 106, called "moon" for a file based on the ISO media base format, is further layered into boxes, with a box 302 needed in the form of a movie header box "mvhd", that contains header information as a whole, and a plurality of "trak" boxes 304 (only one shown in FIG. 3). The trak box 304 is further layered in two boxes, wherein a track header box "tkhd" 306 specifies characteristics of the track.

The trak box 304 further comprises a media box "mdia" 308 containing all the objects, i.e. declaration information about the data packets (normally media data) within a track. The mdia box 308 includes a media header box "mdhd" 310 and a handler reference box "hdlr" 312. The media header box mdhd 310 comprises overall information that is media-independent, and relevant to cover characteristics of the "media", i.e. data packets, in a reception hint track. The handler reference box hdlr 312 declares a process by which the "media-data" in the track is presented, and thus, the nature of the "media" in the track, e.g., a reception hint track.

Further, the media box mdia 308 comprises a media information box "minf" 314. This box contains all objects that declare characteristic information of the "media" (data packets) in the hint track. The media information box minf 314 further comprises a hint media header box "hmhd" 316 containing general information for hint tracks. Further, a data information box "dinf" 318 is comprised by the media information box minf 314. The data information box dinf 318 contains objects that declare the location of the media information in a track.

Further, a sample table box "stbl" 320 is comprised by the media information box minf 314. Data of at least one of the chunks and samples of the media data container mdat 104 is contained in this box, linked to each item. To describe the items in the stbl 320 it is to be observed that stts box 322 comprises the duration of one sample, stsd box 324 comprises sample details, stsz 326 comprises sample size, stsc 328 comprises a number of samples included in a chunk, i.e., the number of data packets, and stco box 330 comprises a chunk offset, each linked with samples/packets in the media data container 104.

As described before, the recorder 116 is adapted to store (transport) timing information and location information of the received data packets 110, 112 in metadata portions 124, 128 of the related reception hint tracks. In particular, the timing information, which may be timing information derived from a reception timestamp or which may be relative timing information derived from subsequent received data/control packets, is stored in a related sample table box stbl 320 of tracks 124, 128.

Figure 4:
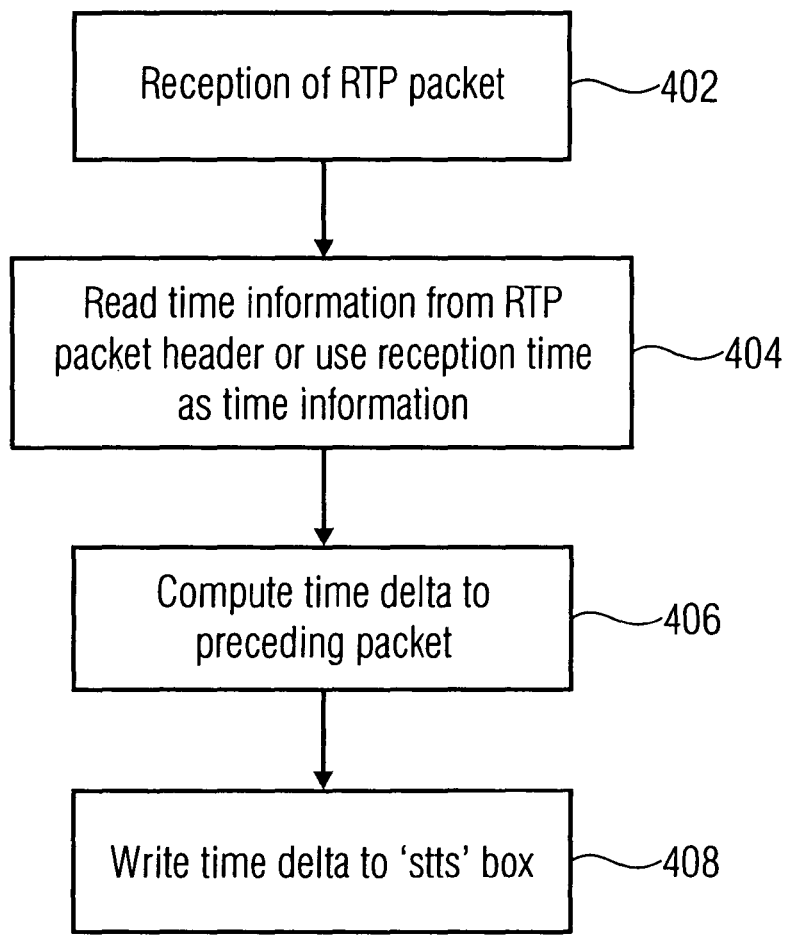
FIG. 4 shows a flow chart of a method for recording a file according to an embodiment of the present invention.

A flow chart showing the process of receiving and storing time-related meta information of received data packets in a sample table box stbl 320 comprised by a metadata track 124, 128 track is shown in FIG. 4.

In a first step 402 a data packet, which might be an RTP packet or an RTCP packet, is received by the receiver 108. In a second step 404 timing information related to the received data packet is obtained by a system clock of the receiver 108 in form of a reception timestamp or from a RTP timestamp of the received data packet. In a subsequent step 406 a time difference to a preceding received data packet is computed. In a step 408 the computed time difference is written to the stts box 322 of the respective metadata track, wherein the stts allows an indexing from reception timing to the respective sample number, i.e. the received and stored packet. That is, according to embodiments of the present invention, the decoding time to sample box stts 322 contains reception time deltas: RT(n+1)=RT(n)+stts(n), where RT(n) denotes reception time for packet n and stts(n) is the uncompressed table entry for packet n.

As mentioned before, samples (packets) within the media data container 104 are grouped into chunks 110, 112. Those chunks can be of different sizes and also the samples within a chunk may have different sizes. The sample to chunk box stsc 328 may be used to find the chunk that contains a specific sample, its position, and the associated sample description. Each entry gives the index of the first chunk of a run of chunks with the same characteristics. By subtracting one entry here from a previous one, one can compute how many chunks are in the respective run. One can convert this into a sample count by multiplying the appropriate samples-per-chunk.

The chunk offset table stco or co64 330 gives the index of each chunk into the media data container 104. There are two variants, permitting the use of 32-bit or 64-bit offsets. The latter is useful when managing very large files 102. Offsets are usually file offsets, not the offsets into any box within the file e.g. a media data container. This permits referring to media data in files without any box structure.

Figure 5:
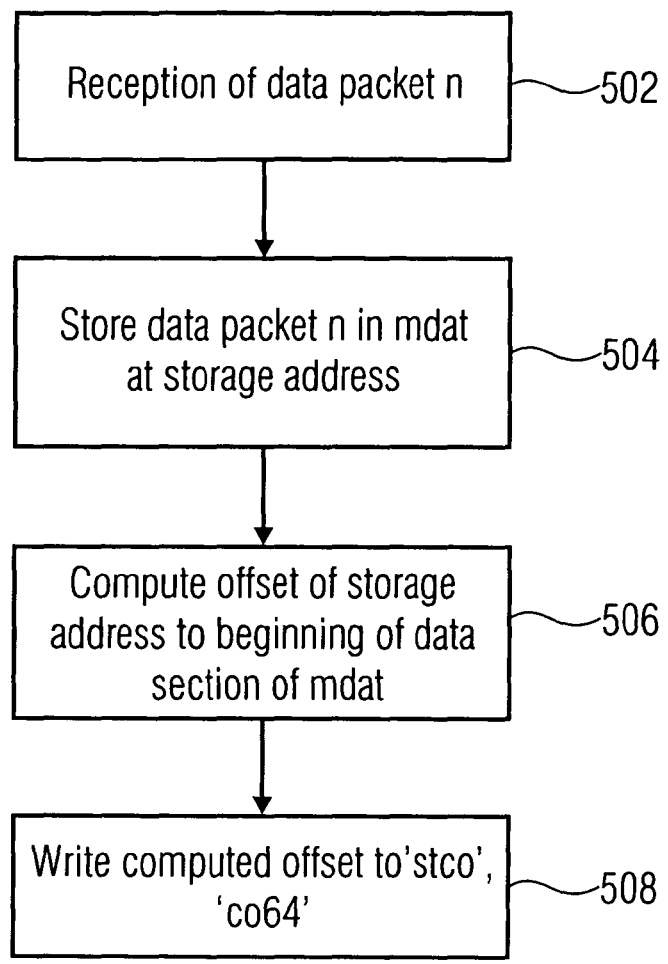
FIG. 5 shows a flow chart of a further method for recording file according to a further embodiment of the present invention.

Hence, according to an embodiment of the present invention the recorder 116 is adapted to store a first chunk offset table 330 indicating an index of each first chunk into the file. This is described with reference to FIG. 5.

After the reception of a data packet by the receiver 108 in a first step 502, a received data packet 110, 112 is stored in the media data container 104 related to the file 102 in a second step 504. Thereby, the received data packet 110, 112 is stored as a sample at a storage address in the media data container 104. In a third step 506 an offset of the storage address to a beginning of the file 102 (if the media data container 104 is comprised by the file 102) or to the beginning of the media data container 104 (if the media data container 104 notes a separate file) is computed. After that, the computed offset is written into the stco or co64 box 330 of the related metadata track 124.

The same holds for the storage of the control packets 114, 115 and their related metadata track 128.

To summarize the above-mentioned, an overview shall be given for operations performed for creating a reception hint track or an associated reception hint track, as e.g. RTP/RTCP reception hint tracks or key stream reception hint tracks that are described in more detail further below. The same holds for virtual media tracks which will also be explained below. When a track is to be added to the file 102 based on the ISO base media file format, the following operations are typically implemented in an apparatus 100 according to embodiments of the present invention.

add a new trak box to the moon box add a new tkhd box to the newly created trak box. This box will contain the characteristics of the track, e.g. the creation time, the track ID, the dimensions of a "media" track and the duration.

Add a new tref box to the newly created trak box. This box indicates the linkage of tracks, i.e. whether a track can stand on its own or can only be used in combination with another track. Note that reception hint tracks can be linked through either a track reference with the tref box or be linked implicitly, e.g. through a sample description that contains data that can be used for linking two or more tracks. Hence, this box is optional but the recommended track linking mechanism.

Add a new mdia box to the newly created trak box.

Add a new mdhd box to the newly created mdia box. This box will contain the characteristics of the media in the track, e.g. the duration of the media and the language.

Add a new hdlr box to the newly created mdia box. This box will contain the identification for the process that typically can consume such a media. In the case of an advanced reception hint track, e.g. an RTCP reception hint track, this identification is 'hint', Add a new minf box to the newly created mdia box.

Add a new hmhd box to the newly created minf box. This box will contain the information header for hint tracks.

Add a new dinf box to the newly created mdia box.

Add a new dref box to the newly created dinf box, indicating that the raw data of the track is either within the file itself or resides externally, e.g. in another file or available through a URI (Uniform Resource Identifier).

Add a new stbl box to the newly created minf box. This box is the container for boxes that contain the timing and data indexing of the samples (e.g. RTP/RTCP or key stream packets, virtual media samples) in a track.

Add a new stsd box to the newly created stbl box. This box contains the identification of the media (commonly referred to as 4CC) and the out-of-band configuration of the samples.

Add a new stts box to the newly created stbl box. This box will contain information on the duration of each individual sample of the media (e.g. RTP/RTCP or key stream packets, virtual media samples) in a track.

Add a new stsc box to the newly created stbl box. This box will contain information on the number of samples (e.g. RTP/RTCP or key stream packets, virtual media samples) grouped to a chunk.

Add a new stsz box to the newly created stbl box. This box will contain information on the size of each individual sample of the media (e.g. RTP/RTCP or key stream packets, virtual media samples) in a track.

Add a new stco or co64 box to the newly created stbl box. This box will contain information on the file offset of the first byte of each chunk.

Add optionally other boxes allowed in the sample table, e.g. the stss box which indexes samples (e.g. RTP/RTCP or key stream packets, virtual media samples) that can be used for random offset.

Samples are grouped in chunks, which are a consecutive block of samples without gaps. When a sample is to be added to the file, it is either appended to an existing chunk or a new chunk is started. For each new sample, entries are added to the stts and stsz box and the stsc box is altered to reflect the number of samples in the present chunk. If the sample is written to a new chunk, a new entry is appended to the stco (or co64) box and the stsc box is altered to reflect the number of samples in the new chunk. The chunk, i.e. the raw sample data itself, is written to the file either inside an mdat box or to an external file (that can be referenced from within the file).

Depending on the operation of the device, advanced reception hint tracks are written to the file in parallel (for RTCP and key stream reception hint tracks), i.e. samples are added to the file when new data arrives or are added at a later point in time in an off-line operation (for virtual media tracks).

The parallel storage of received data packets 110, 112 and associated control messages 114, 115 in reception hint tracks and associated reception hint tracks is an ideal solution during recording and/or time-shifting applications. However, if the recorded file 102 is intended for long-term storage and will be eventually played back many times, it may be desirable to avoid analyzing the stored data during every playback and have media time directly available without further calculations. Usually, this will imply to de-packetize the payload of the data packets from the (RTP) reception hint track and save it to extra media tracks with one elementary stream per track. This is not always possible or desirable, e.g. if transport encryption was applied to the stream data packets if storage capacity is limited. In addition to accurate timing of the transport packets stored in the media data container 104 it is desirable to have extended information available about the reception hint tracks, particularly information on media streams inside, e.g. frame-accurate SMPTE timestamps or subtitles for a video track.

It is desirable to provide for an instant accurate timing synchronization between different recorded media streams without complex processing during each playback of the recorded media streams. I.e., it is desirable that a recorded media stream does not need to be de-jittered every time it is to be played back, and that for a playback of a recorded file a clock-recovery of all included streams is not necessary.

Figure 6:
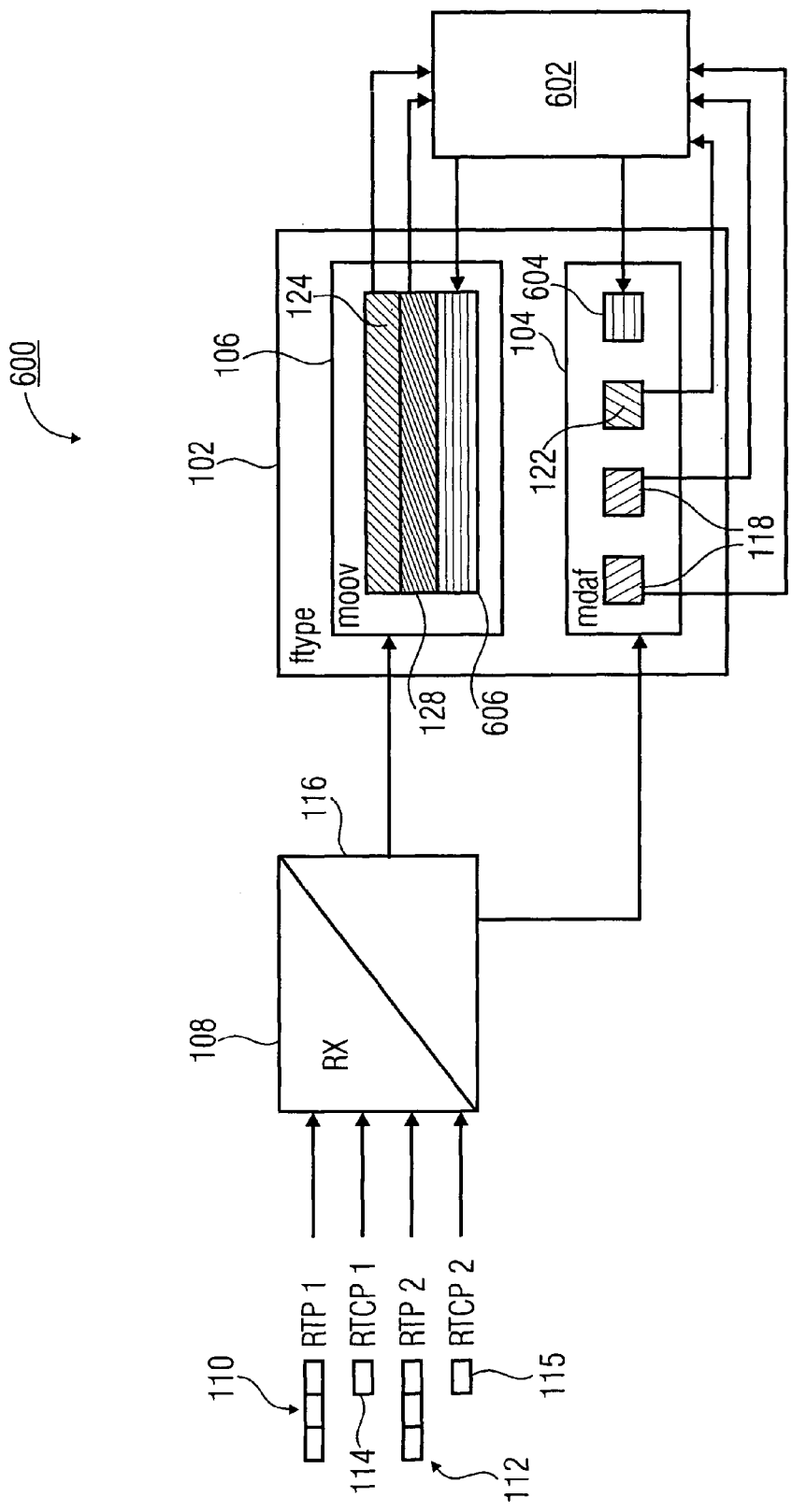
FIG. 6 shows a schematic block diagram of an apparatus for recording and processing a file to obtain virtual media tracks according to an embodiment of the present invention.

Turning now to FIG. 6, an apparatus 600 for processing stored data packets and stored associated meta information is shown, according to an embodiment of the present invention.

The apparatus 600 differs from the apparatus 100 shown in FIG. 1 in a processor 602 for determining, based on the stored data packets and the stored associated meta information, decoding information for a payload of the stored data packets, wherein the decoding information indicates at which time instant to replay which payload of the stored data packets. The apparatus 600 may be an extension of the apparatus 100, however, the apparatus 600 may also be seen separately, in particular if it used for processing stored non-RTP/RTCP packets, like, e.g., MPEG-2 TS packets.

In the embodiment shown in FIG. 6 the data packets are stored in the media data container 104 related to the file 102. The meta information is stored in the metadata container 106 of the file 102, as explained above. The stored data packets may be stored as samples in chunks 118, 122 of the media data container 104. The samples and/or the chunks are referenced by associated metadata tracks 124, 128 in the metadata container 106.

According to an embodiment of the present invention, the stored data packets may comprise first and second RTP packets 110, 112 comprising first and second packetized media data and associated first and second RTCP packets 114, 115, as described above.

According to another embodiment of the present invention the stored data packets may comprise MPEG-2 transport stream data packets, comprising a stream multiplex of one or more programs, typically audio and video. MPEG-2 transport stream data packets typically have a length of 188 bytes.

According to an embodiment of the present invention the determined decoding information is stored in form of decoding information samples in decoding information chunks 604 in the media data container 104. Thereby, each decoding information sample relates to an access unit, e.g. a video or an audio frame that can be reconstructed from stored data packets in the media data portion of the reception hint track.

The processor 602 is adapted to determine the decoding information samples on a media frame basis, such that a decoding information sample indicates a start-address and an end-address of a media access unit, wherein the start-address denotes a location of a media data sample indicating a beginning of said media access unit and wherein the end-address denotes a location of media data sample indicating an end of said media access unit, wherein the media data samples are comprised by the data packets in the media data container 104.

The processor 602 may access the media data container 104 in order to store a decoding information sample as a virtual media sample in the chunk 604 in the media data container 104. Further, the processor 602 may access the media data container 106 in order to store decoding meta information related to the decoding information sample (virtual media sample) and indicating a decoding time and a location of the decoding information sample in a metadata track 606 in the media data container 104. As explained before, the decoding information samples may be seen as virtual media samples, each referring to an access unit of a related video or audio stream. A virtual media sample comprises information about how to reconstruct a related audio/video frame from the stored data packets in the media data container 104.

Figure 7:
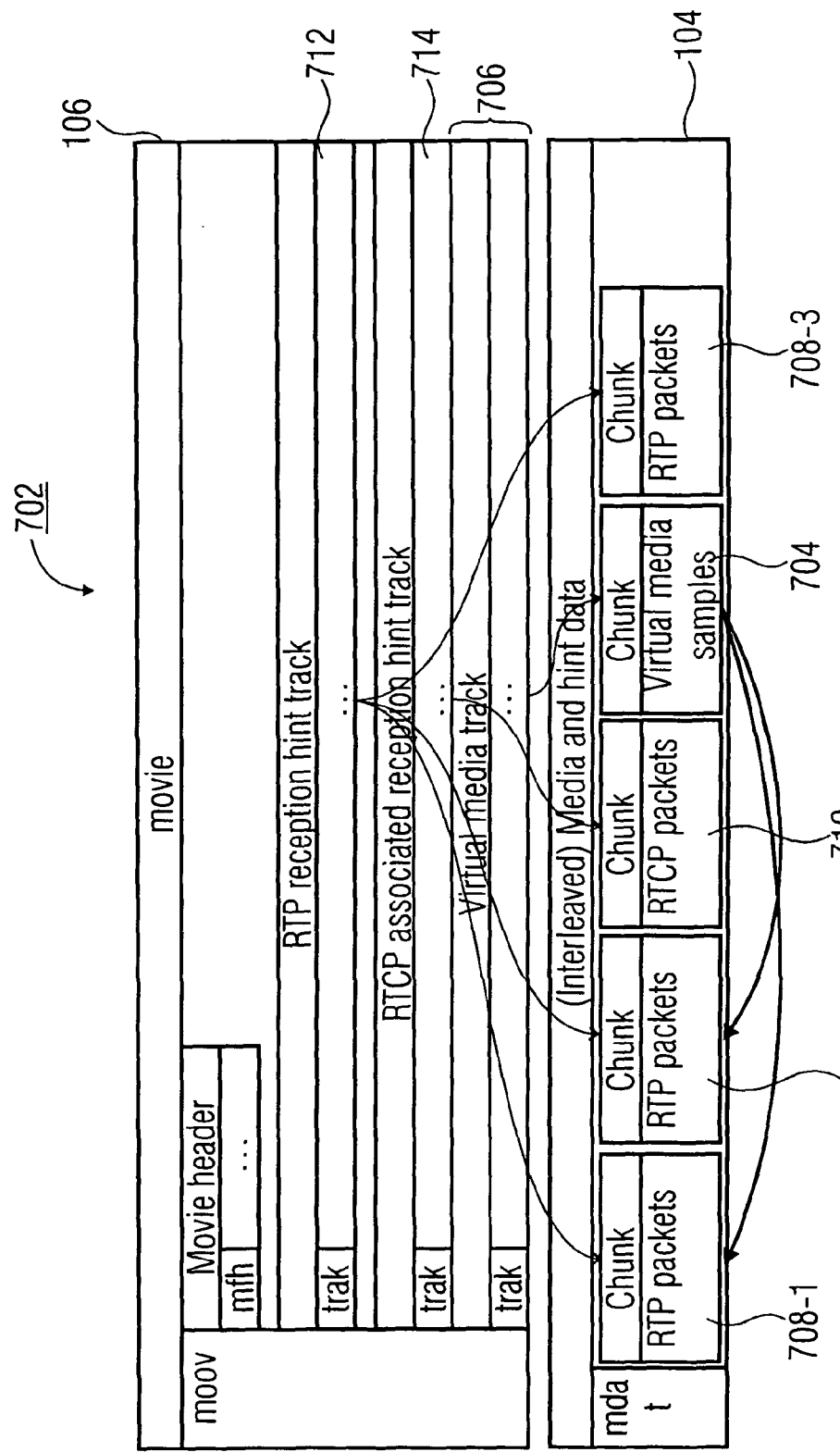
FIG. 7 shows a schematic structure of a recorded file having a virtual video track according to an embodiment of the present invention.

Turning now to FIG. 7 a file 702 is shown comprising virtual media samples 704 in the media data container 104 and an associated virtual metadata track 706 in the metadata container 106.

The file 702 has also stored RTP packets in chunks 708 comprised by the media data container 104 and RTCP packets comprised by chunks 710. To the stored RTP packets there is associated a RTP metadata track 712. To the stored RTCP packets there is associated a RTCP metadata track 714 in the metadata container 106.

As it is indicated by the arrows the virtual media samples in virtual media chunk 704 relate to RTP packets stored in chunks 708. The virtual media samples may contain constructors for reconstruction of access units, i.e., e.g. media frames, from the stored transmission units, i.e. data packets, stored in chunks 708. The virtual media samples may contain links to one or more significant transmission units, relevant for the reconstruction of a particular access unit (incomplete constructor). Also, a virtual media sample may be empty, e.g. in case of a packet loss during reception. A further alternative is that virtual media samples contain completely unpacked media samples describing a media frame, like it is the case in a classic media track.

The generic payload configuration data of a virtual media sample includes the generic payload configuration data of a non-virtual media track of the same type, e.g. a virtual media track for H.264 coded video will also contain the AVCConfigurationRecord in an avcC box inside the sample description. In addition, it may include information on the de-hinting process of the reception hint track, e.g. the maximum size of a media sample, being reassembled from a reception hint track by using the information provided in the sample payload of the virtual media track.

The payload of a sample of a virtual media track consists of "commands" that describe the process of extracting the media sample data from a reception hint track. These commands are derived from the packet constructors for hint tracks and include an "immediate constructor", a "sample constructor" and a "sample description constructor". The immediate constructor consists of the fields "length", "data" and "pad". "Length" indicates the length of the field "data". "Pad" may be used to fill overprovisioned space.

The sample constructor consists of the fields trackrefindex, length, samplenumber and sampleoffset. Trackrefindex indicates the reception hint track from which data is extracted, samplenumber, indicates the sample number of the reception hint track. The field sampleoffset specifies the beginning of the data block of length "length" that is to be extracted.

By using sample constructors, a compact representation of a media sample is possible without copying data.

The sample description constructor consists of the fields trackrefindex, sampledescriptionindex, sampledescriptionoffset and length. Equally to a sample constructor, data from the sample description of a reception hint track is used for inclusion in the virtual media sample.

A virtual media track uses media timing, i.e. the decoding timestamps are not affected by transmission delays or clock frequency inaccuracies. The timing is equivalent to the timing of a media track that could be generated from the information available in a virtual media track.

Figure 8:
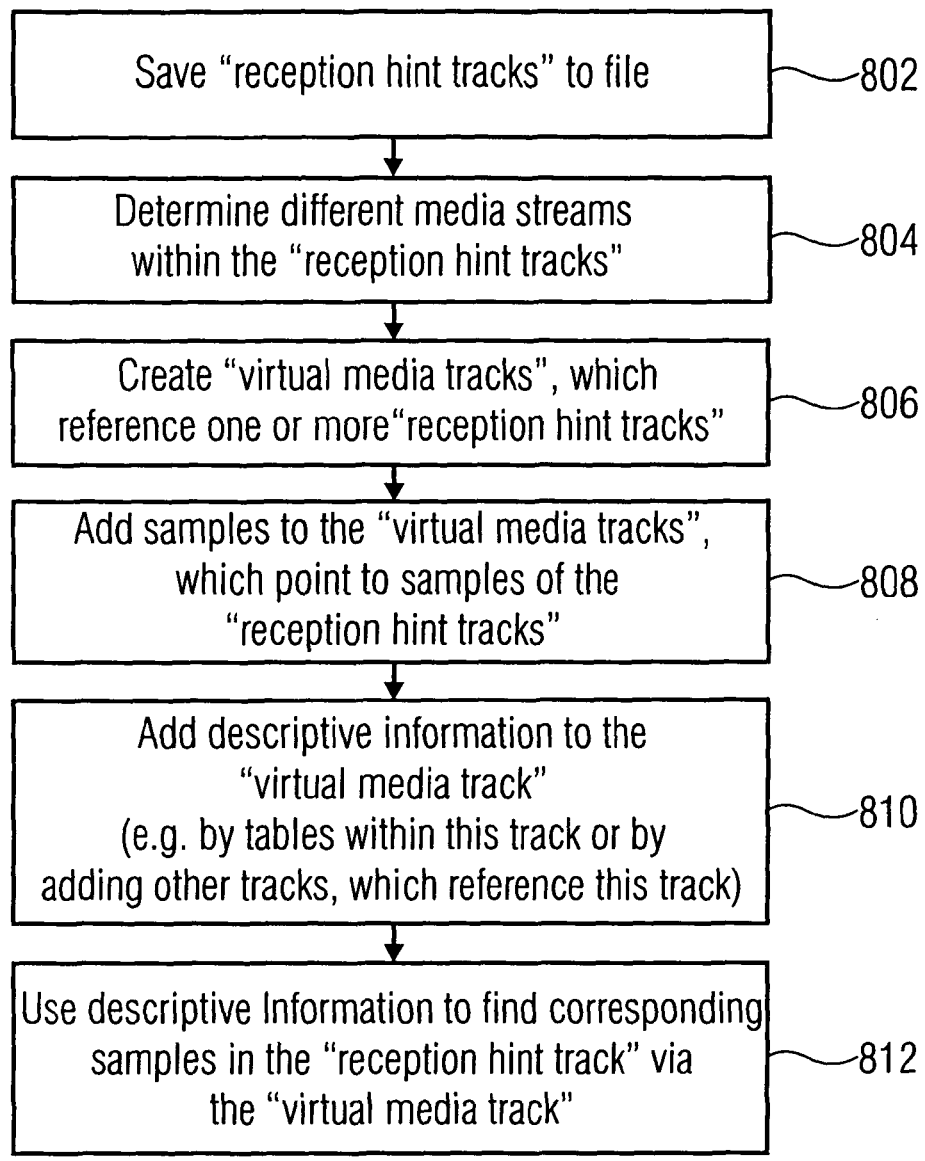
FIG. 8 shows a flow chart of a method for recording data packets, creating virtual media samples and replaying media samples comprised by the stored data packets by means of the virtual media samples according to an embodiment of the present invention.

FIG. 8 shows a flow chart of stream recording and an offline file optimization.

In a first step 802 reception hint tracks and optionally associated reception hint tracks (e.g. RTP and RTCP) are saved to the file 102 as explained above. After completion of recording, i.e. when the data packets are saved to the file 102 in form of a reception hint track and eventually associated control packets are saved to the file in an associated reception hint track, different media streams are determined within the recorded reception hint track in a step 804. That means that step 804 comprises determining e.g. audio and video streams or data packets related to audio and video streams, respectively, within the recorded reception hint track. This can be done by extracting appropriate information from the session description protocol (SDP), as has been explained above.

Hence, the processor 602 is adapted to determine which of the stored data packets relate to the first or the second media data samples and to determine second decoding information samples (second virtual media samples) related to the second media data samples in the media data container 104.

In a further step 806, for each identified media stream a virtual media track (comprising media and meta-data) is created, which references a related reception hint track.

I.e., the processor 602 is adapted to store first decoding information samples (first virtual media samples) related to the first media data samples in the media data container 104 and to store first decoding meta information in the metadata container 106, the first decoding meta information indicating a location (e.g. chunk offset, sample number, etc.) of the first decoding information samples in the media data container 104. The processor 602 is adapted to store second decoding meta information in the metadata container 106, the second decoding meta information indicating a location (e.g. chunk offset, sample number, etc.) of the second decoding information samples in the media container 104.

That is, the created virtual media track references the reception hint track which comprises the data packets having the payload according to the respective media stream. After creating the virtual media tracks virtual media samples (decoding information samples) are added to the virtual media tracks, wherein the virtual media samples point to samples or packets in the media data portions of the reception hint tracks and recover accurate timing from control transmit units (e.g. RTCP sender reports).

RTCP sender reports contain an RTP timestamp and a corresponding common timestamp among streams in the NTP timestamp format. The RTP timestamp and the NTP timestamp allow a conversion value to be determined. With this RTP/NTP timestamp conversion value and RTP timestamp's clock frequency, it is possible to calculate the received RTP packet's corresponding timestamp among streams in the NTP timestamp format. In this way the media timing for each sample of an RTP reception hint track, i.e. each stored data packet, might be obtained in a post-processing to the recording of the data packets.

In a further step 810, descriptive information is added to the virtual media track (e.g. by tables within this track or by adding other tracks, which reference this track). Thereby the added descriptive information may indicate a start-address and an end-address of a media frame associated to the virtual media sample, wherein the start-address denotes a location of a media data sample indicating a beginning of the media frame and wherein the end-address denotes a location of a media data sample indicating an end of the media frame, wherein the media data samples are comprised by the payload of the data packets in the media data container 104.

In a further optional playback-step 812 the descriptive information of the virtual media samples is used to find corresponding samples in the reception hint track via the virtual media track. Step 810 may be used e.g. for replaying the media streams comprised by the stored data packets.

Figure 9:
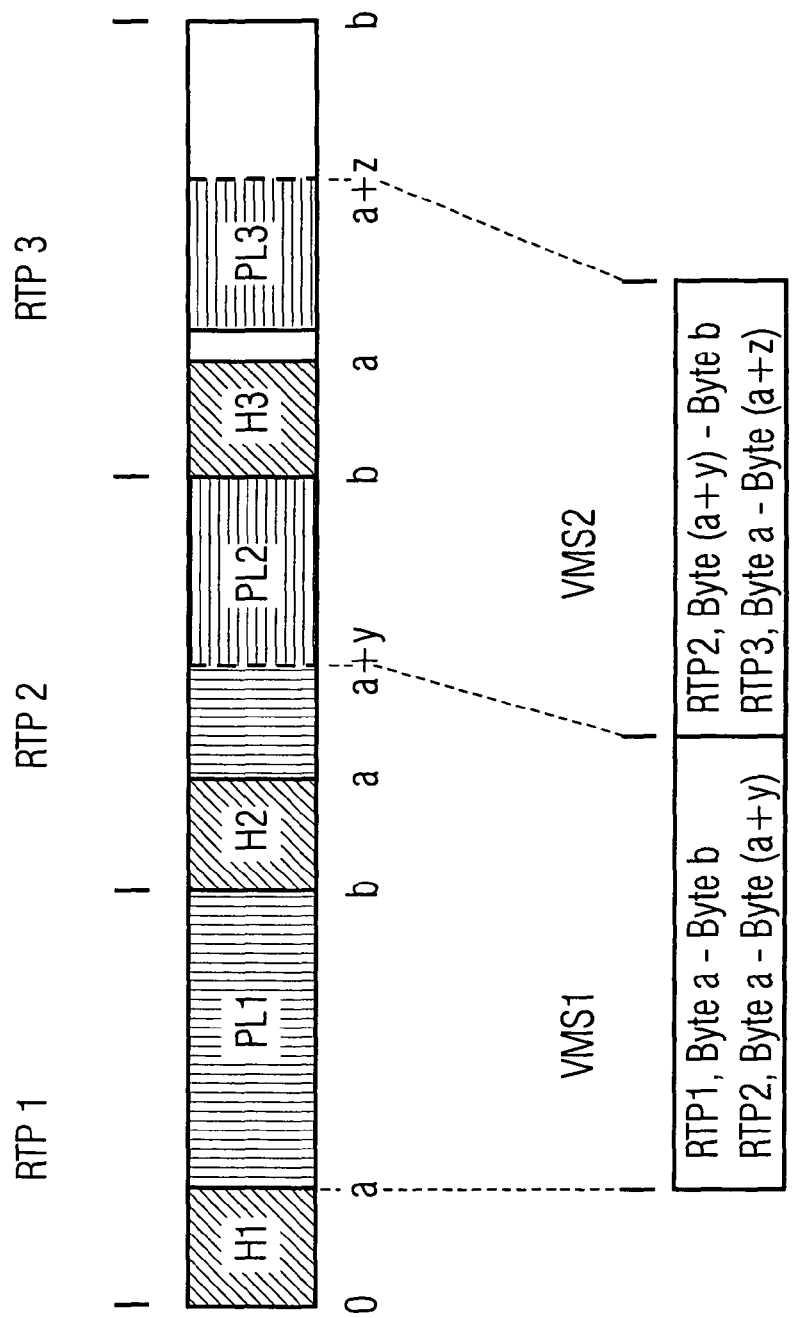
FIG. 9 shows an example of how to obtain the descriptive information of a virtual media sample referencing media frames comprised by payload of stored data, according to an embodiment of the present invention.

An example of how to obtain the descriptive information of a virtual media sample referencing media frames comprised by payload of stored data packets in a reception hint track is shown in FIG. 9.

FIG. 9 shows a series of stored RTP packets RTP1, RTP2, RTP3. The RTP packets RTP1, RTP2, RTP3 are stored as samples in the virtual media container 104. The RTP packets RTP1, RTP2, RTP3 each comprise a header H1, H2, H3 and a payload PL1, PL2, PL3 comprising media data samples. Exemplarily the header size is A bits, respectively, the payload size is (B-A) bits. The data of a first media frame, which may be a video or audio frame, is partitioned among the payloads of the first RTP packet RTP1 and the second RTP packet RTP2. Exemplarily, the media data of the first media frame reaches from byte A of RTP packet RTP1 to byte A+Y of data packet RTP2. Media data of a second media frame is partitioned among data packet RTP2, starting at byte address A+Y, and data packet RTP3, ending at byte address A+Z of data packet RTP3.

Virtual media samples VMS1 and VMS2 relate to the first media frame and the second media frame, respectively. According to embodiments of the present invention, the virtual media samples VMS1, VMS2 comprise information about where to find the media data of the first and second media frame in the stored data packets RTP1, RTP2, RTP3. That is, virtual media packet VMS1 comprises information, that the media data of frame 1 can be obtained by accessing data packet RTP1 from byte address A to byte address B, and by addressing data packet RTP2 from byte address a to byte address A+Y. Virtual media sample 2 comprises information of where to obtain the media samples for media frame 2. That is, it stores information that media frame 2 starts in data packet RTP2, byte address A+Y up to byte address B, and that further media samples of frame 2 can be found in data packet RTP3 reaching from byte address A to byte address A+Z.

The virtual media samples VMS1 and VMS2, which form media data portions of a virtual media track, are both referenced by a metadata portion of the virtual media track in the meta data container 106. Decoding-time-to-sample information can be found in an stts box for each virtual media sample VMS1, VMS2. Thereby, the decoding-time-to-sample information reflects media timing that may have been determined by evaluating stored RTCP packets associated to the RTP packets RTP1, RTP2, RTP3, as explained above.

Figure 10:
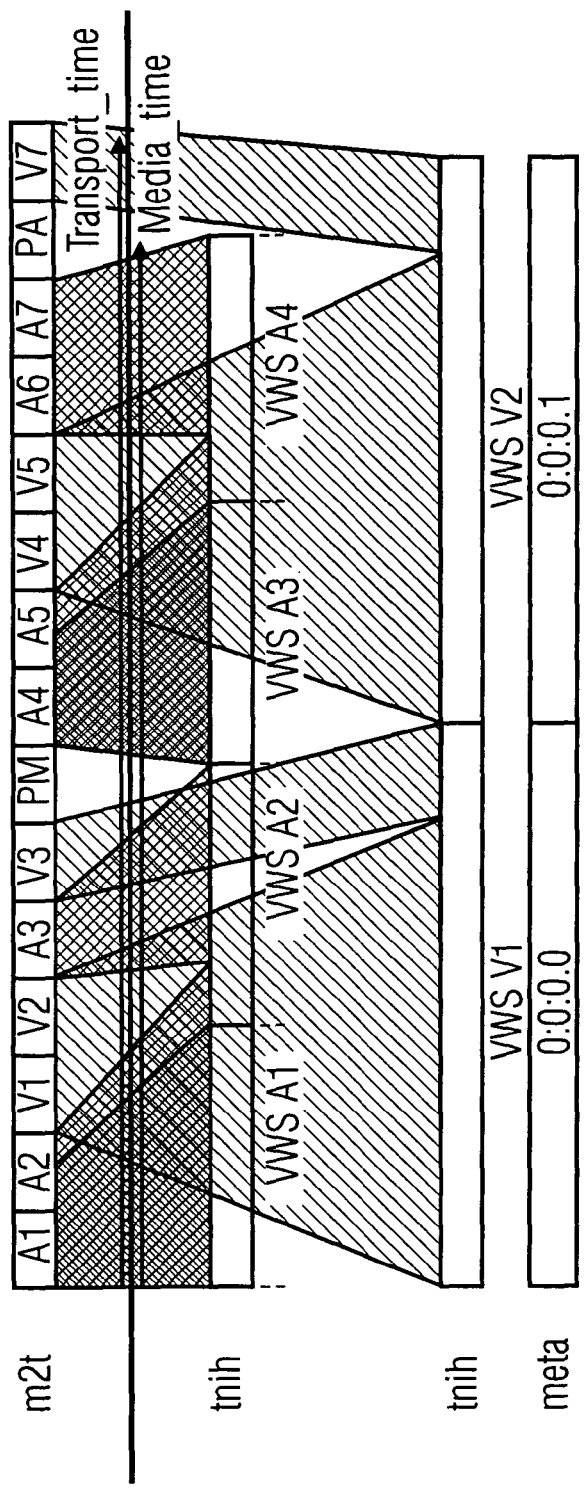
FIG. 10 shows a mapping of samples of reception hint tracks and virtual media tracks according to an embodiment of the present invention.

FIG. 10 illustrates a mapping of samples of a reception hint track to samples of virtual media tracks.

In contrast to FIG. 9, FIG. 10 shows stored data packets of a MPEG-2 transport stream M2T. The transport stream M2T comprises data packets A1 to A7 comprising audio samples and data packets V1 to V7 comprising video samples.

A virtual media sample VMSA1 relates to a first audio frame which is divided among the payloads of audio packets A1 and A2. The virtual media sample VMSA1 indicates which part of the payload of A1 and A2 to take for obtaining audio frame 1. Likewise, virtual media sample VMSA2 is related to a second audio frame the media data of which may be found in the payloads of audio packet A2 and A3. The virtual media sample VMSA3 references audio packet A4 and parts of audio packet A5 to obtain a third audio frame. Virtual media sample VMSA4 references the remaining part of audio packet A5 and the payload of audio packets A6 and A7 for audio frame 4.

Likewise, virtual media sample VMSV1, related to a first video frame, references the payloads of video packet V1, V2 and V3 for the first video frame. Virtual media sample VMSV2 references the payloads of video packets V4, V5 and V6 for obtaining the media samples for a second video frame.

In order to replay media content on the basis of reception hint tracks referencing stored RTP packets and associated reception hint tracks referencing stored RTCP packets, embodiments of the present invention provide an apparatus for reading a file, the file having stored, in a media container related to the file, first data packets comprising packetized first media data samples based on a first clock and second data packets comprising packetized second media data samples based on a second clock different from the first clock. The file has further stored at least a portion of associated first control packets including information for indicating a relationship of the first clock to a reference clock and at least a portion of associated second control packets including information for indicating a relationship of the second clock to the reference clock. The file has further stored associated meta data in a meta data container, the associated meta data comprising timing information of the received first and second data packets and the received first and second control packets and location information indicating a location of the stored first and second data packets and the stored first and second control packets in the media data container. The apparatus comprises a processor for determining an output schedule of the stored first and second data packets by accessing the media data container and by interpreting the timing information of the stored first and second data packets and the stored first and second control packets in the media data container. The apparatus further comprises an output controller for outputting the data packets in accordance with the determined output schedule by accessing the metadata container and by reading the data packets from the media data container.

In accordance with an embodiment of the present invention the processor is adapted to determine the output schedule such that the output schedule reflects an order of reception of the first and second data packets, when the order of reception is indicated by the stored timing information of the received first and second data packets. That is, with this embodiment a simulation of the original reception scenario can be performed.

In accordance with a further embodiment, the processor is adapted to determine synchronization information based on the stored timing information of the first and second data packets and reference timestamps contained in the stored first and second control packets, such that an output schedule of the first data packets is synchronized to an output schedule of the second data packets with respect to the reference time (NTP). That is, with this embodiment a timing synchronization of the received and stored first and second data packets can be performed.

A device that reads reception hint tracks will typically use the following set of operations to detect whether it can parse the file:

Parse the ftyp box to detect whether the file content and structure are potentially parseable. If the file cannot be parsed, abort the file reading operation.

Parse the moon box and detect the number of trak boxes inside. If there are no tracks, abort the file reading operation.

Parse the hdlr box inside the minf box of each track to detect whether there is a handler process available for the handler type, defined in the hdlr box. If the handler is not recognized, abort the file reading operation for this track.

Parse the stbl box and the stsd box inside the minf box of each track. The stsd box contains the identification of the track's content and describes the content. If the content is not understood, abort the file reading operation of the track.

If the file can be parsed, the track linkage is determined by parsing the tref box inside the trak boxes. Alternatively, if the format defines track linkage internally, use the information available in the stsd box of the track. If track linkage cannot be determined, it is assumed that the track is single-standing and can be parsed without information contained in other tracks. Track linkage is stored internally in the reading device and used when needed in the process of understanding the raw data contained in a track.

Depending on the operation of the device, it can select the tracks it understands and which are relevant for the presentation of the file. By default, all tracks are parsed, however the following rules apply:

For virtual media tracks, the virtual media track is used instead of the RTP or MPEG-2 TS reception hint track. This track already contains the data for reversing the hinting operation, i.e. which data of the reception hint track needs to be extracted and be extended with other data to create an elementary stream data block, a decoder can natively understand.

For RTCP reception hint tracks, the first mode of operation is that the RTCP track is consumed in parallel with the RTP reception hint track. The reader device uses the available logic of generic RTP/RTCP reception for synchronizing streams.

For RTCP reception hint tracks, the second mode of operation is the consumption of the entire RTCP reception hint track before the normal read operation is started to detect initial synchronization and clock-drift between several RTP reception hint tracks. In this mode e.g. linear regression is applied for aligning the RTP clocks of several RTP reception hint tracks. The skew is then applied to the streams when the data is consumed to facilitate continuous synchronized playout of multiple RTP reception hint tracks.

For key stream reception hint tracks, the first mode of operation is that the key stream reception hint track is consumed in parallel to the RTP or MPEG-2 TS reception hint track. This ensures that key stream data for a particular protected data block of the reception hint tracks is available in a similar fashion as with a real broadcast.

The second mode of operation is an alignment of the key stream data and the data of the reception hint track so that validity periods are no more overlapping. This allows later editing of the track without the need of understanding the timing of the key stream data.

For getting the so-called samples from a track, the position inside the file needs to be derived. This operation for the k-th sample S is accomplished by Determining the chunk C the sample S resides in by using the data of the stsc box Parsing the stco (or co64) box for determining the file offset F of the chunk C Parsing the stsz box for getting the size L of sample S and the sizes $K_i$ of all previous samples $P_i$ inside the chunk.

The data is then available at position $(F+sum(K_i))$ in the file and has the size L.

The time when the data is to be played out is determined by the information available in the stts box. This box contains the run-length coded durations $D_j$ for each individual sample j. The playout time for the k-th sample S is then the sum of all durations $D_j$, with j<k.

In case a virtual media track is available, embodiments of the present invention provide an apparatus for reading a file, the file having stored, in a media data container, data packets comprising a payload, and having stored, in the media data container 104, decoding information for the payload of the stored data packets, wherein the decoding information indicates at which time instant to replay which payload of the stored data packets. The file has stored associated metadata in a metadata container 106, the associated metadata indicating a decoding time and a location of the decoding information in the media data container. The apparatus according to the embodiment of the present invention comprises a processor for determining an output schedule of the payload of the stored data packets by accessing the associated metadata in the metadata container 106 and by accessing, based on the metadata, the decoding information in the media data container, and by accessing, based on the decoding information, the payload for the stored data packets, and an output controller for outputting the payload in accordance with the determined output schedule.

As mentioned in the introductory portion of this specification, another aspect of the present invention is to store, in addition to received data packets, key stream messages.

Rights to access data or data packets may be controlled via a rights management system. Receiving data content via a digital communications network may be limited to certain end-users and restricted from other users. E.g., a user may purchase access to a program by paying a fee for the program. If the user pays the fee the user may be granted access to the program for a specified period of time while a user who has not paid the fee may not have access to the program. Access to the program may be regulated by encryption of the transmitted data. The data may be encrypted by any number of encryption standards through the use of an encryption key. At the receiver or user terminal, a key may be used to decrypt the encrypted data such that the content may be viewable at the receiver or user terminal. The key for decrypting the encrypted data packets may also be delivered via the same digital communications network and may also be encrypted. For the delivery of one or more keys also other digital communications networks can be used. Thus, an end-user wishing to access or view the program or service may need to obtain the rights to the keys.

Transport encryption keys associated with an encrypted program or a service may be transmitted in a key stream to a user terminal. The key stream may include key stream messages that are transmitted at a predetermined frequency when an encrypted data stream is received at the receiver or user terminal the key stream messages may also be received.

Figure 12:
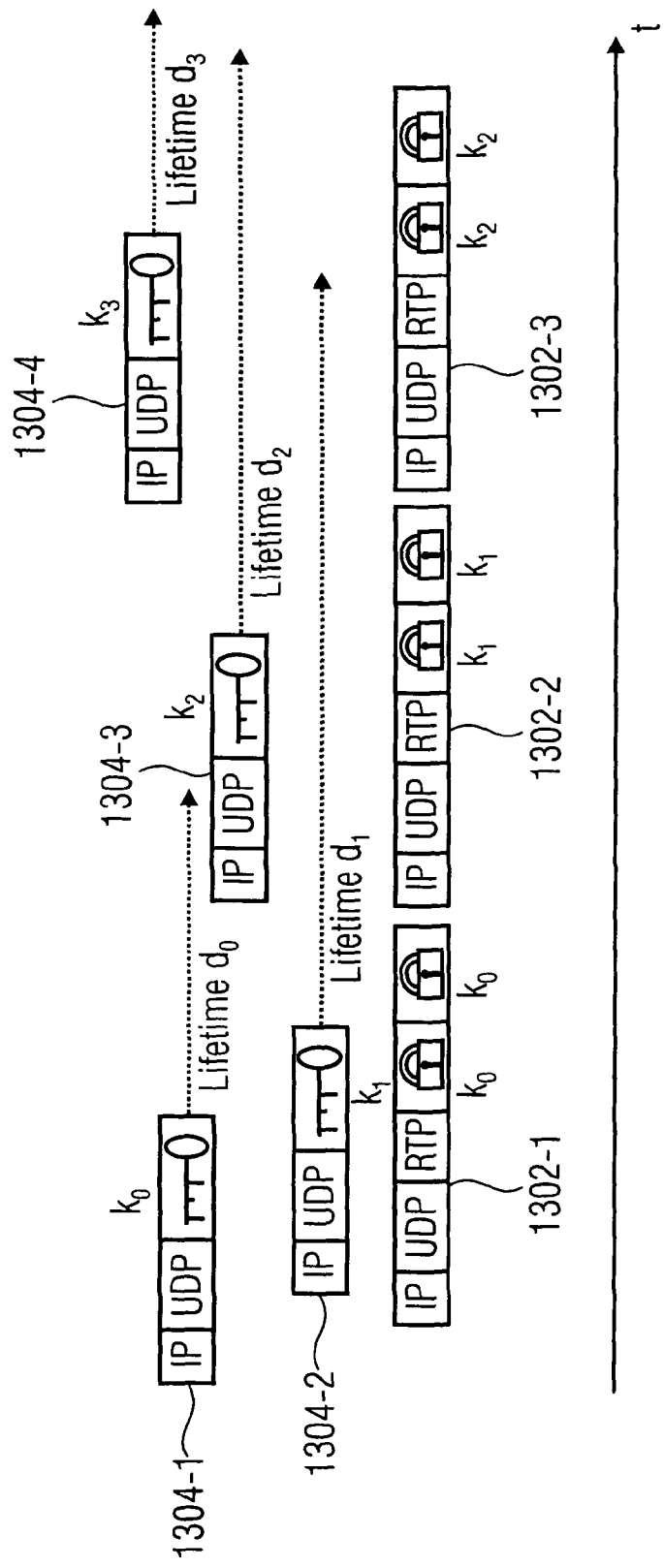
FIG. 12 shows a principle of key stream and media synchronization in a mobile TV environment.

FIG. 12 shows streamed data packets 1302-1, 1302-2, 1302-3, each having a payload encrypted with cryptographic keys $k_0$, $k_1$, $k_2$. Associated to the data packets 1302 there is a key stream comprising key stream packets 1304-1, 1304-2, 1304-3 and 1304-4. The key stream packet 1304-1, which is delivered in time before its associated data packet 1302-1 comprises a cryptographic key $k_0$ for the decryption of the encrypted payload of data packet 1302-1. Thereby, the encryption key $k_0$ has a lifetime $d_0$ associated with it assuring that the associated data packets can be encrypted. The same holds for the second key stream packet 1304-2 and its cryptographic key $k_1$, which may be used for decrypting the payload of the associated data packet 1302-2. Also here the associated key stream packet 1304-2 is delivered well ahead of time before data packet 1302-2, and the cryptographic key $k_1$ has a lifetime $d_1$ ensuring correct decryption of the payload of data packet 1302-2.

According to embodiments of the present invention data packets and associated key stream packets may be stored, at a receiver terminal, together in a file having a media data container in the metadata container, as has been explained for data packets and associated control packets before.

Figure 11:
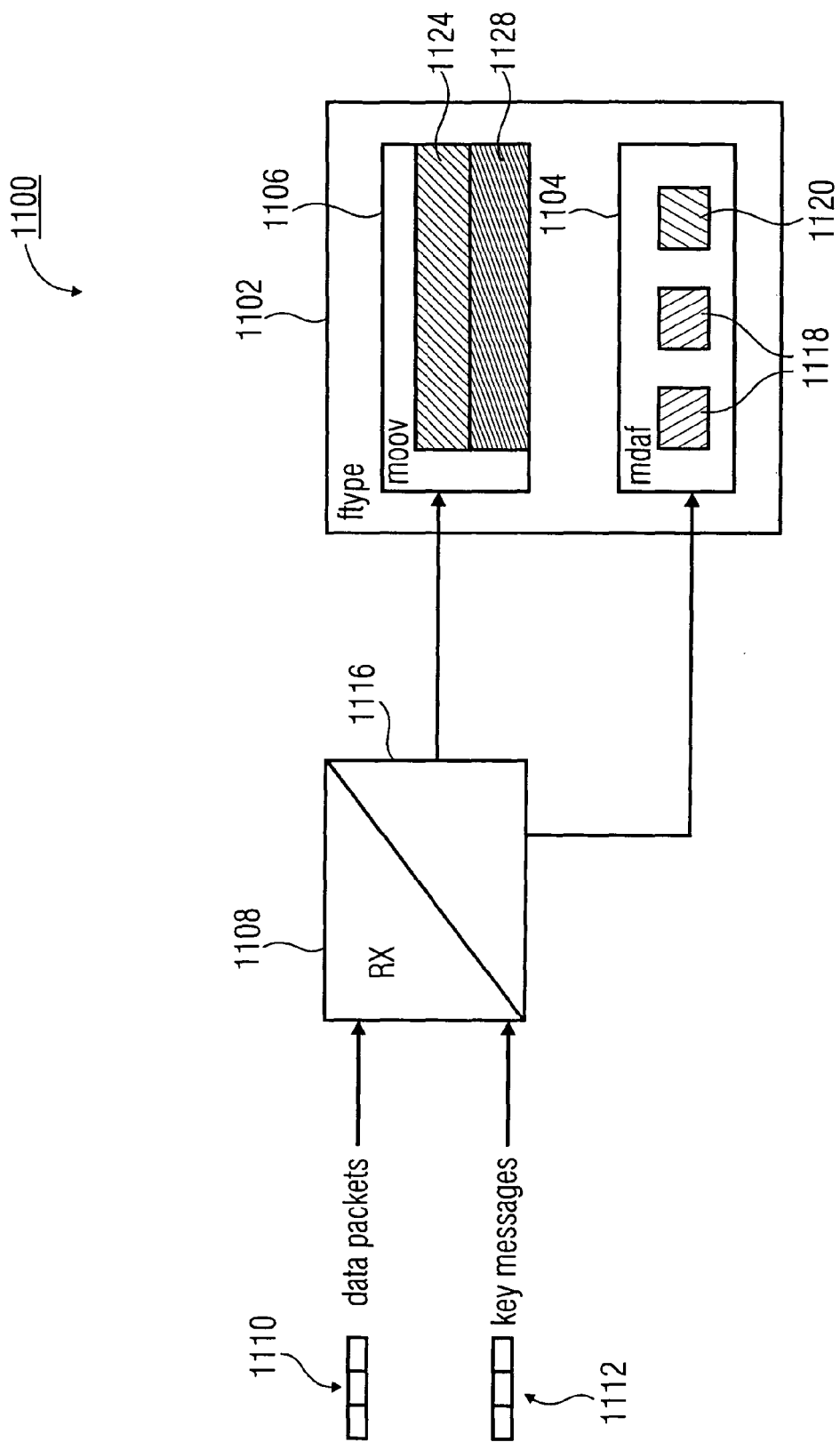
FIG. 11 shows a schematic block diagram of an apparatus for recording a file according to a further embodiment of the present invention.

FIG. 11 shows an apparatus 1100 for recording a file 1102 having a related media data container 1104 and a metadata container 1106 according to an embodiment of the present invention.

The apparatus 1100 comprises a receiver 1108 for receiving data packets 1110, each comprising a payload, and for receiving key stream packets 1112 comprising a plurality of cryptographic keys, wherein each cryptographic key is associated to a payload of the received data packets. Further, the apparatus 1100 comprises a recorder 1116 for storing the received data packets 1110 and the received key stream packets 1112 in the media data container 1104 and for storing associated metadata in the metadata container 1106, the associated metadata comprising transport timing information of the received data packets 1110 in the received key stream packets 1112 and comprising location information indicating a location of the stored data packets 1110 and the stored key stream packets 1112 in the media data container 1104.

It shall be emphasized that the apparatus 1100 may be used in conjunction with or may be comprised in the apparatus 100. That is, the inventive concept of storing data packets together with associated control packets, storing data packets together with associated key stream packets and to create decoding information in form of media tracks out of the stored data packets and the associated control packets and/or the associated key stream packets, may be combined.

Turning again to FIG. 11, the received data packets 1110 are stored as samples in first chunks 1118 of the media data container 1104. The received associated key stream packets are stored as samples in second chunks 1120 of the media data container 1104. According to an embodiment of the present invention, the first and second chunks 1118 and 1120 may be stored in an interleaved manner in the media container 1104.

As has been explained above, the file 1102 may be a file based on the ISO base media file format, e.g. a MP4 file. Hence, the recorder 1116 is adapted to store the first chunks 1118 in a first chunk offset table stco or co64 of a first metadata track 1124 of the metadata container moon 1106, wherein the first chunk offset table indicates an index of each first chunk 1118 into the file 1102 or the media data container 1104, depending on whether the media data container 1104 is part of the file 1102 or not. Indexes of the second chunks into the media data container 1104 are stored in a second chunk offset table of a second metadata track 1128 of the metadata container 1106 in the same manner as explained for the first chunks.

As it was already explained for the case of parallel storage of data packets 110, 112 and associated control packets 114, 115 in reception hint tracks and associated reception hint tracks, transport timing information, i.e. reception time or RTP timestamp, for the data packets 1110 is stored in a first stts box comprised by the first metadata track 1124. Likewise, transport timing information or differential transport timing information is stored in a second stts box of the second metadata 1128 track related to the second chunks 1120.

Further, to ease playback after reception of the stream is completed, a one-time processing may be performed to convert the key stream reception hint track into a virtual metadata track. For this purpose the apparatus 1100 comprises a processor (not shown) to assign, based on the stored data packets 1110 and the associated meta information 1124, and based on the stored key stream packets 1112 and the associated key stream meta information 1128, decryption information for a payload of the stored data packets 1110, wherein the decryption information indicates which cryptographic key to use at which time instant to replay the payload of the stored data packets 1110.

That is, the key messages from the key stream reception hint track with transport timing are transformed to key samples in a virtual metadata track with media timing. This is done based on the same concept has been explained for the virtual media tracks above. That is, key samples are created and stored in the media data container 1104. Thereby, each key sample is related to an access unit or a media frame and comprises information on which cryptographic key to use for the related media frame. In the associated metadata track 1128 comprising a stts box, decoding-to-key-sample information is given. The decoding-to-key-sample information indicates at which time instant to access the respective key sample, which again refers to the payload data of the stored data packets to yield the respective encrypted media frame. If needed, key samples are virtually doubled, such that every media sample in the media track has an associated key sample (with the same key ID) in the key track.

It is therefore possible to create an accurate timing relationship between the media access units, e.g. media frames, and the key messages, especially if the encrypted access units can be reconstructed from the transport units (data packets) in case of content encryption.

For reading a file 1102, the file having stored data packets 1110 and having stored associated key stream packets 1112 in the media data container 1104 and having stored associated metadata in the metadata container 1106, embodiments of the present invention provide an apparatus comprising a processor for assigning, based on the stored data packets 1110, based on the associated packet meta information 1124 and based on the stored key stream packets 1112 and the associated key stream meta information 1128, the encryption information to a payload of the stored data packets, wherein the decryption information indicates which cryptographic key to use at which time to replay the payload of the stored data packets.

The processor for assigning decryption information may be used for a player of the payload of the encrypted data packets 1110. For this reason, decrypted data packets may be output to a decoder based on the assigned decryption information. The processor for assigning the decryption information may also be used to generate virtual decryption information to be stored partly in the media data container 1104 as virtual key samples. Associated meta information is stored in metadata track 1128. This corresponds to the concept of the virtual media tracks described above.

The payload of a key sample may comprise the raw payload of a key stream message as received. This means that the content of a UDP packet of the key stream is stored directly. Some systems may wrap this data inside another structure to allow the storage of multiple received key stream messages.

The timing of a key stream sample is dependent on the timing method of its base RTP reception hint track. If the RTP reception hint track derives its decoding time from the RTP timestamps, the key stream reception hint track will also derive its decoding time from the RTP timestamps, however it may need to extrapolate the RTP timestamps. If the reception time is used for RTP reception hint tracks, reception timing will also be used for storing key stream messages. In general both RTP reception hint tracks and key stream reception hint tracks are synchronized and use the same time base.

To summarize, the present invention relates to a media storage system that records received "transmission units" (TUs)—which typically contain packetized media data, e.g. video data—as pre-computed packets or constructors in a reception hint track together with "control transmission units" (CTU) in samples of a file. The control transmission units are stored in a separate parallel track that is associated to the reception hint track.

CTUs contain additional data that is needed or useful to process the media packets of the reception hint track during playback from file. Examples of CTUs are RTCP reports or key messages in case of encrypted streams.

For optimized local playback of the recorded streams, a "virtual media track" maps the received TUs to "virtual media samples", using a reversed hinting process. The virtual media samples have the timing of media samples, possibly recovered from the track with CTUs and the reception hint track and need not be complete media samples. Indexing of virtual media tracks is applied if appropriate. The indexes also apply to the linked samples of the reception hint track. The virtual media track may be used as a reference for other tracks (e.g. "timed metadata tracks") within the file. Applications may look up the corresponding samples of the reception hint track via the virtual media track.

Key stream messages are stored as an associated reception hint track. A virtual media track can be applied to align media samples and decryption keys accurately.

Recently, the above mentioned ISO base media file format has been supplemented by an addition called movie fragments, which have e.g. been described in the US patent application US 2007/0130498 A1. It shall be mentioned that embodiments of the present invention can also be applied to said movie fragments.

Depending on the circumstances, the inventive methods may be implemented in hardware or in software. The implementation may be done on a digital storage medium, particularly a disk or a CD with electronically readable control signals, which may cooperate with a programmable computer system so that the method is executed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for recording a file comprising a related media data container and a metadata container, the apparatus comprising:

a receiver arranged to receive first streamed Real-Time Transport Protocol (RTP) packets comprising packetized first media data samples based on a first clock, to receive second streamed RTP packets comprising second media data samples based on a second clock different from the first clock, wherein the second media data samples are associated to the first media data samples, to receive first Real-Time Transport Control Protocol (RTCP) packets related to the first streamed RTP packets and comprising information for indicating a relationship of the first clock to a reference clock, and to receive second RTCP packets related to the second streamed RTP packets and comprising information for indicating a relationship of the second clock to the reference clock; and a recorder arranged to store the received first and second streamed RTP packets and at least RTCP sender reports of the received first and second RTCP packets in the media data container, and to store associated metadata in the metadata container, the associated metadata comprising reception time and/or transport protocol timestamp information of the received first and second streamed RTP packets and the received first and second RTCP packets and location information indicating a location of the stored first and second RTP packets and the stored first and second RTCP packets in the media data container; wherein at least one of the receiver and the recorder is hardware or a combination of hardware and software.

2. The apparatus according to claim 1, wherein the recorder is adapted to store the first and second received RTP packets as samples in first chunks of the media data container, and to store the RTCP sender reports of the received first and second RTCP packets as samples in second chunks of the media data container.

3. The apparatus according to claim 2, wherein the recorder is adapted to store the first and second chunks in an interleaved manner in the media data container.

4. The apparatus according to claim 1, wherein the recorder is adapted to store the reception time and/or transport protocol timestamp information and the location information of the first and second RTP packets in a first track of the metadata container, and to store the reception time and/or transport protocol timestamp information and the location information of the first and second RTCP packets in a second track of the metadata container.

5. The apparatus according to claim 1, wherein the recorder is adapted to store the reception time and/or transport protocol timestamp information of the first and second RTP packets in a first sample table box allowing an indexing from reception timing of a first and/or second RTP packet to its associated sample number in the first chunks, and to store the reception timing information of the first and second RTCP packets in a second sample table box allowing indexing from a reception timing of a first and/or second RTCP packet to its associated sample number in the second chunks.

6. The apparatus according to claim 5, wherein the recorder is adapted to store a first chunk offset table indicating an index of each first chunk into the file, and to store a second chunk offset table indicating an index of each second chunk into the file.

7. The apparatus according to claim 1, wherein the apparatus comprises a processor arranged to determine synchronization information for synchronizing the first and second media data samples based on the stored reception time and/or transport protocol timestamp information of the first and second RTP packets and NTP timestamps comprised in the stored first and second RTCP packets associated to the first and second RTP packets.

8. The apparatus according to claim 7, wherein the processor is configured to determine, based on the stored first and second RTP packets, the stored first and second RTCP packets and based on the stored associated meta information, decoding information for a payload of the stored RTP packets, wherein the decoding information indicates at which time instant to replay which payload of the stored RTP packets.

9. The apparatus according to claim 8, wherein the processor is adapted to determine which of the stored RTP packets relate to the first or the second media data samples, and to store first decoding information samples related to the first media data samples in the media data container and to store first decoding meta information in the metadata container, the first decoding meta information indicating a location of the first decoding information samples in the media container, and to store second decoding information samples related to the second media data samples in the media data container and to store second decoding meta information in the metadata container, the second decoding meta information indicating a location of the second decoding information samples in the media container.

10. The apparatus according to claim 1, wherein the receiver is adapted to further receive key stream packets comprising a plurality of cryptographic keys, wherein each cryptographic key is associated to a payload of at least one of the first and/or the second RTP packets, and wherein the recorder is adapted to store the received key stream packets in the media data container and to store associated transport timing information in the metadata container.

11. The apparatus according to claim 10, wherein the recorder is adapted to store the key stream packets as samples in key chunks of the media data container and to store the associated transport timing information and location information indicating a location of the key stream packets in the media data container in a key track of the metadata container.

12. The apparatus according to claim 10, wherein the recorder is adapted to store the transport timing information in a key sample table box allowing indexing from a transport timing of a key stream packet to its associated sample number in the key chunks.

13. The apparatus according to claim 10, wherein the recorder is adapted to store a reception time index of a key stream packet as the associated transport timing information or to store a packet timestamp of a RTP packet received in a predefined time interval around a reception time of the key stream packet as the associated timing information of the key stream packet.

14. The apparatus according to claim 10, wherein the processor is adapted to assign, based on the stored first and second RTP packets, based on the stored first and second RTCP packets, based on the associated meta information and based on the stored key stream packets and the associated key stream meta information, decryption information to a payload of the stored first and/or second RTP packets, wherein the decryption information indicates which cryptographic key to use at which time to replay the payload of the stored first and/or second RTP packets.

15. The apparatus according to claim 14, wherein the processor is adapted to store the decryption information in decryption information samples in the media data container and to store associated decryption instruction meta information in the metadata container.

16. The apparatus according to claim 1, wherein the file is based on the International Organization for Standardization (ISO) base media file format.

17. A method for recording a file comprising a related media data container and a metadata container, the method comprising:

receiving first streamed Real-Time Transport Protocol (RTP) packets comprising packetized first media data samples based on a first clock, receiving second streamed RTP packets comprising second media data samples based on a second clock different from the first clock, wherein the second media data samples are associated to the first media data samples, receiving first Real-Time Transport Control Protocol (RTCP) packets comprising information for indicating a relationship of the first clock to a reference clock, and receiving second RTCP packets comprising information for indicating a relationship of the second clock to the reference clock; and storing the received first and second streamed RTP packets and at least RTCP sender reports of the received first and second RTCP packets in the media data container, and storing associated metadata in the metadata container, the associated metadata comprising reception time and/or transport protocol timestamp information of the received first and second streamed RTP packets and the received first and second RTCP packets and location information indicating a location of the stored first and second RTP packets and the stored first and second RTCP packets in the media data container.

18. A non-transitory computer readable storage medium having stored thereon a computer-program for executing, when the computer-program is running on a computer or microcontroller, a method for recording a file comprising a related media data container and a metadata container, the method comprising:

receiving first streamed Real-Time Transport Protocol (RTP) packets comprising packetized first media data samples based on a first clock, receiving second streamed RTP packets comprising second media data samples based on a second clock different from the first clock, wherein the second media data samples are associated to the first media data samples, receiving first Real-Time Transport Control Protocol (RTCP) packets comprising information for indicating a relationship of the first clock to a reference clock, and receiving second RTCP packets comprising information for indicating a relationship of the second clock to the reference clock; and storing the received first and second streamed RTP packets and at least RTCP sender reports of the received first and second RTCP packets in the media data container, and storing associated metadata in the metadata container, the associated metadata comprising reception time and/or transport protocol timestamp information of the received first and second streamed RTP packets and the received first and second RTCP packets and location information indicating a location of the stored first and second RTP packets and the stored first and second RTCP packets in the media data container.

19. An apparatus arranged to read a file, the file comprising stored, in a media data container related to the file, first streamed Real-Time Transport Protocol (RTP) packets comprising packetized first media data samples based on a first clock and second streamed RTP packets comprising packetized second media data samples based on a second clock different from the first clock, and the file comprising stored at least a Real-Time Transport Control Protocol (RTCP) sender report of associated first RTCP packets comprising information for indicating a relationship of the first clock to a reference clock and comprising stored at least a RTCP sender report of associated second RTCP packets comprising information for indicating a relationship of the second clock to the reference clock, the file comprising stored associated metadata in a metadata container of the file, the associated metadata comprising reception time and/or transport protocol timestamp information of the received first and second streamed RTP packets and the received first and second RTCP packets and location information indicating a location of the stored first and second RTP packets and the stored first and second RTCP packets in the media data container, the apparatus comprising:
- a processor arranged to determine an output schedule of the stored first and second RTP packets by accessing the metadata container and by interpreting the reception time and/or transport protocol timestamp information of the stored first and second RTP packets and the stored first and second RTCP packets in the media data container, wherein the processor is adapted to determine synchronization information based on the stored reception time and/or transport protocol timestamp information of the first and second RTP packets and reference timestamps comprised in the RTCP sender reports of the stored first and second RTCP packets, such that an output schedule of the first RTP packets is synchronized to an output schedule of the second RTP packets with respect to media timing of the first and second media data samples, wherein the media timing is based on reference time information; and
- an output controller arranged to output the first and second RTP packets in accordance to the determined output schedule by accessing metadata container and by reading the RTP packets from the media data container; wherein
at least one of the processor and the output controller is hardware or a combination of hardware and software.

20. The apparatus according to claim 19, wherein the processor is adapted to determine the output schedule such that the output schedule reflects an order of reception of the first and second RTP packets, wherein the order of reception is indicated by stored reception timing information of the received first and second RTP packets.

21. The apparatus according to claim 19, wherein the file is based on the International Organization for Standardization (ISO) base media file format.

22. A method for reading a file, the file comprising stored, in a media data container related to the file, first streamed Real-Time Transport Protocol (RTP) packets comprising packetized first media data samples based on a first clock and second streamed RTP packets comprising packetized second media data samples based on a second clock different from the first clock, and the file comprising stored at least a Real-Time Transport Control Protocol (RTCP) sender report of associated first RTCP packets comprising information for indicating a relationship of the first clock to a reference clock and comprising stored at least a RTCP sender report of associated second RTCP packets comprising information for indicating a relationship of the second clock to the reference clock, the file comprising stored associated metadata in a metadata container of the file, the associated metadata comprising reception time and/or transport protocol timestamp timing information of the received first and second streamed RTP packets and the received first and second RTCP packets and location information indicating a location of the stored first and second RTP packets and the stored first and second RTCP packets in the media data container, the method comprising:
- determining an output schedule of the stored first and second RTP packets by accessing the metadata container and by interpreting the reception time and/or transport protocol timestamp information of the stored first and second RTP packets and the stored first and second RTCP packets in the media data container, wherein synchronization information is determined based on the stored reception time and/or transport protocol timestamp information of the first and second RTP packets and reference timestamps comprised in the RTCP sender reports of the stored first and second RTCP packets, such that an output schedule of the first RTP packets is synchronized to an output schedule of the second RTP packets with respect to media timing of the first and second media data samples, wherein the media timing is based on reference time information; and
- outputting the first and second RTP packets in accordance to the determined output schedule by accessing metadata container and by reading the RTP packets from the media data container.

23. A non-transitory computer readable storage medium having stored thereon a computer-program for executing, when the computer-program is running on a computer or microcontroller, a method for reading a file, the file comprising stored, in a media data container related to the file, first streamed Real-Time Transport Protocol (RTP) packets comprising packetized first media data samples based on a first clock and second streamed RTP packets comprising packetized second media data samples based on a second clock different from the first clock, and the file comprising stored at least a Real-Time Transport Control Protocol (RTCP) sender report of associated first RTCP packets comprising information for indicating a relationship of the first clock to a reference clock and comprising stored at least a RTCP sender report of associated second RTCP packets comprising information for indicating a relationship of the second clock to the reference clock, the file comprising stored associated metadata in a metadata container of the file, the associated metadata comprising reception time and/or transport protocol timestamp timing information of the received first and second streamed RTP packets and the received first and second RTCP packets and location information indicating a location of the stored first and second RTP packets and the stored first and second RTCP packets in the media data container, the method comprising:

determining an output schedule of the stored first and second RTP packets by accessing the metadata container and by interpreting the reception time and/or transport protocol timestamp information of the stored first and second RTP packets and the stored first and second RTCP packets in the media data container, wherein synchronization information is determined based on the stored reception time and/or transport protocol timestamp information of the first and second RTP packets and reference timestamps comprised in the RTCP sender reports of the stored first and second RTCP packets, such that an output schedule of the first RTP packets is synchronized to an output schedule of the second RTP packets with respect to media timing of the first and second media data samples, wherein the media timing is based on reference time information; and outputting the first and second RTP packets in accordance to the determined output schedule by accessing metadata container and by reading the RTP packets from the media data container.

\* \* \* \* \*

UNITED STATES PATENT AND TRADEMARK OFFICE
CERTIFICATE OF CORRECTION

PATENT NO. : 8,462,946 B2  
APPLICATION NO. : 12/666327  
DATED : June 11, 2013  
INVENTOR(S) : Doehla et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this
Eighth Day of September, 2015

Michelle K. Lee
*Director of the United States Patent and Trademark Office*